(12) United States Patent
Xiao et al.

(10) Patent No.: US 6,327,641 B1
(45) Date of Patent: Dec. 4, 2001

(54) METHOD OF IMPLEMENTING A GEOMETRY PER WEDGE (GPW) BASED HEADERLESS SOLUTION IN A DISK DRIVE FORMATTER AND A COMPUTER PROGRAM PRODUCT INCORPORATING THE SAME

(75) Inventors: Kang Xiao, Irvine; Dennis Keats, Riverside; Andrew Yanowitz, Ben Lomond, all of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/052,146

(22) Filed: Mar. 31, 1998

(51) Int. Cl.[7] .................................................. G06F 12/00
(52) U.S. Cl. .......................................................... 711/112
(58) Field of Search ........................... 711/111, 112, 114, 711/204; 360/48, 49, 78.14; 710/22, 23, 24, 25, 26, 27, 28

(56) References Cited

U.S. PATENT DOCUMENTS

| | | | |
|---|---|---|---|
| 4,910,725 | * | 3/1990 | Drexler et al. ..................... 369/275.1 |
| 5,784,216 | * | 7/1998 | Zaharris ................................. 360/48 |
| 5,835,930 | * | 11/1998 | Dobbek .................................. 711/4 |
| 5,903,410 | * | 5/1999 | Blaum et al. ..................... 360/77.08 |
| 5,910,725 | * | 6/1999 | Gist ..................................... 323/313 |
| 5,978,954 | * | 11/1999 | Ou et al. .............................. 714/769 |
| 6,167,461 | * | 12/2000 | Keats et al. ............................ 710/5 |
| 6,181,497 | * | 1/2001 | Malone, Sr. ......................... 360/48 |

* cited by examiner

Primary Examiner—Matthew Kim
Assistant Examiner—Christian P. Chace
(74) Attorney, Agent, or Firm—W. Daniel Swayze, Jr.; Wade James Brady, III; Frederick J. Telecky, Jr.

(57) ABSTRACT

A method of implementing a geometry per wedge (GPW) based headerless solution in a disk drive formatter having a corresponding memory buffer. The disk drive formatter includes high and low processing engines and formats a data storage disk. The method includes the step of processing a command instruction, which instructs the high-level processing engine to execute a disk operation with respect to a predetermined sector. The method also includes the steps of searching for the predetermined sector using sector layout information derived from a GPW table including entries which define the relative position of sector pulses on a track within a data wedge of the disk, and transferring the predetermined sector from the disk to the buffer memory.

18 Claims, 14 Drawing Sheets

METHOD OF IMPLEMENTING A GEOMETRY PER WEDGE (GPW) BASED HEADERLESS SOLUTION IN A DISK DRIVE FORMATTER AND A COMPUTER PROGRAM PRODUCT INCORPORATING THE SAME

BACKGROUND OF THE INVENTION

1. Field of the Invention

The present invention relates to the operation of a disk formatter implemented in a disk drive controller. More particularly, the present invention relates to a method of implementing a geometry per wedge (GPW) based headerless solution in a disk drive formatter and a computer program product incorporating the same.

2. Description of Related Art

Conventional disk drives employ disk formatters having a fixed architecture capable of handling a single formatting scheme. By way of example, the formatting scheme may rely upon the use of a header associated with each sector of user data residing on the tracks of a magnetic disk to uniquely identify the sector. However, using headers takes up space on the magnetic disk which could otherwise be employed for storing user data. Accordingly, a number of alternate formatting schemes that do not rely upon headers have been implemented in commercial disk drives. Yet, the disk formatters that use these alternative formatting schemes, rather than being designed to accommodate a number of different formatting schemes, are instead "hard-wired" for a single formatting scheme, which reduces the flexibility of the disk formatter.

Accordingly, even where a disk formatter might uses a writeable control store (WCS) to provide some programming capability that implements a particular formatting scheme, the writeable control store often relies on such a small amount of memory and is so primitive that a system processor (e.g., digital signal processor (DSP) or microcontroller) must be employed to constantly update the writeable control store with commands and monitor the status of the writeable control store. In addition, when a writeable control store is used for disk formatting, the DSP must dedicate resources which could otherwise be employed for non-formatting related tasks.

One disadvantage inherent in conventional prior art disk formatters is that they cannot be readily adapted to contend with rapid changes in disk drive technology which are geared toward increasing the number of tracks or bits per inch stored on the magnetic disk. Moreover, the proliferation of vendor specific diagnostic tools used in disk formatters requires greater flexibility on the part of those disk formatters to accommodate different diagnostic techniques.

In order to contend with different disk formatting schemes, a flexible disk formatter architecture has been developed which is the subject of a U.S. patent application entitled, "Programmable High Performance Disk Formatter for Headerless Disk Controller," Ser. No. 09/052,145, filed Mar. 31, 1998, now U.S. Pat. No. 6,167,461.

The inventive disk formatter described in the above-mentioned application requires the use of two processing engines to facilitate disk operations. One of the two processing engines, referred to below as a high level processing engine, executes user-defined code based on a set of instructions created for a disk formatter application. The use of a high level processing engine reduces the processing power required by the DSP to implement a particular formatting scheme.

These sequencing instructions are executed by the other processing engine, referred to below as a low level processing engine, to directly control disk operation. By way of example, the low level processing engine may execute sequencing instructions which control the reading and writing of data to a disk, as well as the formatting of a disk.

In view of the foregoing, what is needed is software which takes advantage of the flexible architecture of the above-mentioned invention while at the same time implementing a headerless based formatting scheme so as to conserve space on the disk.

SUMMARY OF THE INVENTION

The principal advantage of the present invention is the provision of a computer programming scheme which implements a headerless based formatting scheme in a disk formatter having a flexible architecture.

In view of the foregoing, it is an object of the present invention to provide a method of implementing a geometry per wedge (GPW) based headerless solution in a disk drive formatter having a corresponding memory buffer. The disk drive formatter includes high and low processing engines and formats a data storage disk.

The method includes the step of processing a command instruction which instructs the high-level processing engine to execute a disk operation with respect to a predetermined sector. The method also includes the steps of searching for the predetermined sector using sector layout information derived from a GPW table including entries which define the relative position of sector pulses on a track within a data wedge of the disk, and transferring the predetermined sector from the disk to the buffer memory.

According to one aspect of the invention the step of searching may include the steps of determining whether the next sector to be searched for corresponds to the target sector and determining whether the next sector is a bad sector if the next sector corresponds to the target sector. The step of searching also includes the steps of searching for the next good sector if the next sector corresponds to a bad sector and assigning the next good sector as the target sector.

It is to be understood that both the foregoing general description and the following detailed description are exemplary and explanatory and are intended to provide further explanation of the invention as claimed.

BRIEF DESCRIPTION OF THE DRAWINGS

These and other features, aspects and advantages of the present invention will become better understood with reference to the following description, appended claims, and accompanying drawings, in which:

DETAILED DESCRIPTION OF THE PREFERRED EMBODIMENTS

The present invention is directed to an apparatus and method for providing for efficient communication between high and low level processing engines of a disk formatter. Although the disk formatter is described in conjunction with magnetic disks, the same inventive concepts are applicable to all disc-shaped information storage media, for example, optical storage discs such as compact discs and more particularly, digital versatile discs (DVDs).

Figure 1:
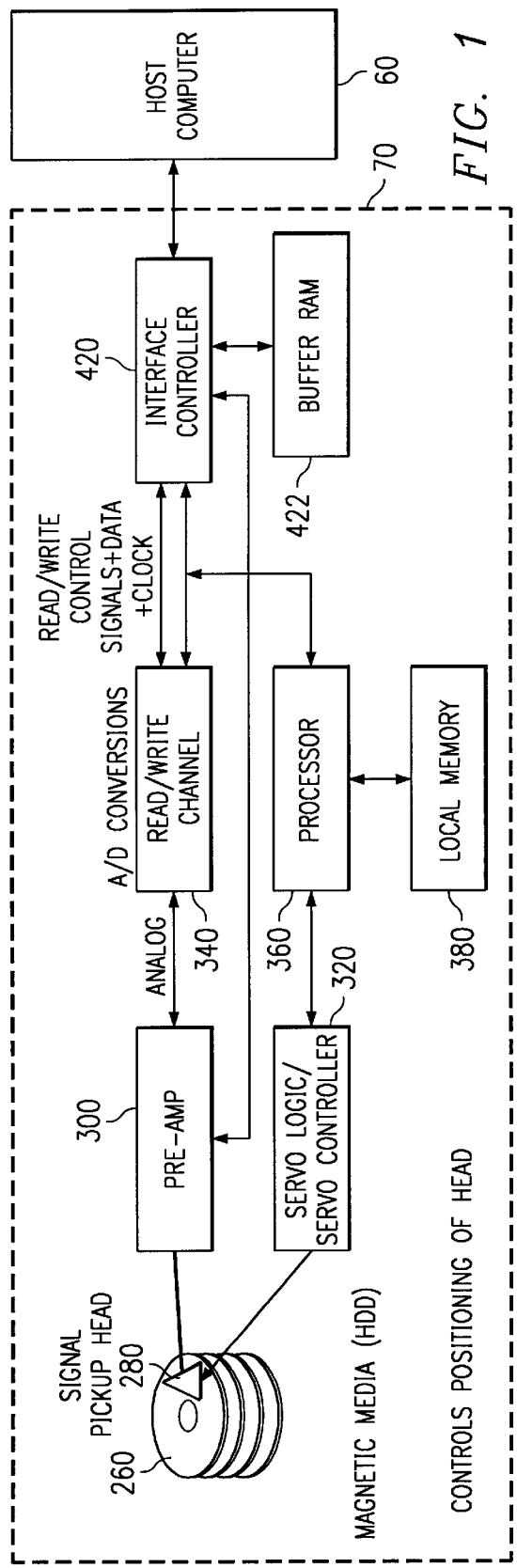
FIG. 1 shows a host computer and a hard disk drive system.

FIG. 1 depicts a host computer 60 which interacts with a hard disk drive system 70 of a type in which the present invention may be employed. The hard disk drive system 70 includes a plurality of magnetic disks 260 arranged along an axis which extends perpendicularly to the face of each disk.

The hard disk drive system 70 also includes at least ore signal pick-up head 280 which is provided over the surface of one of the magnetic disks 260. Although there is a signal pick-up head 280 for each of the magnetic disks, in order to simplify FIG. 1, multiple signal pick-up heads are not shown. The signal pick-up head 280 reads data stored on the disk and outputs the data to a pre-amp 300 which amplifies the signal. The signal pick-up head 280 is controlled by the servo logic of a servo controller 320 which positions the signal pick-up head 280 accurately over a predetermined track of one of the magnetic disks 260.

The pre-amp 300 outputs an analog signal to a read/write channel 340 which extracts digital data (e,g, NRZ data) together with a clock signal from the analog signal. Thereafter, the digital data and clock are output from the read/write channel 340 to the interface controller 420 where sectors are formed. A digital signal processor 360 (DSP or microcontroller) controls the overall disk drive operation including implementing servo control algorithms to seek, track, and control spindle speed. The DSP 360 also programs the read/write channel 340 and the interface controller 420. The DSP 360 has a corresponding local memory device 380 that includes static random access memory (SRAM), which is used as a scratch pad, and an erasable programmable memory (EPROM), which stores fixed content tables and programs.

The digital data and clock extracted by the read/write channel 340 are also output to an interface controller 420 which controls the flow of data from the magnetic disk read by the signal pick-up head 280. The interface controller 420 is connected to a memory buffer 422 which temporarily stores the extracted digital data in order to account for the transfer speed difference between the disk data rate and the host interface data rate. The memory buffer 422 may be a random access memory (RAM) chip, or, more specifically, a dynamic random access memory (DRAM) chip.

The interface controller 420 is also connected to the host computer 60 to transmit data to the host computer 60 upon request. Although the reading of data from a magnetic disk has been described, the process can be reversed in order to write data sectors to a magnetic disk.

Figure 2:
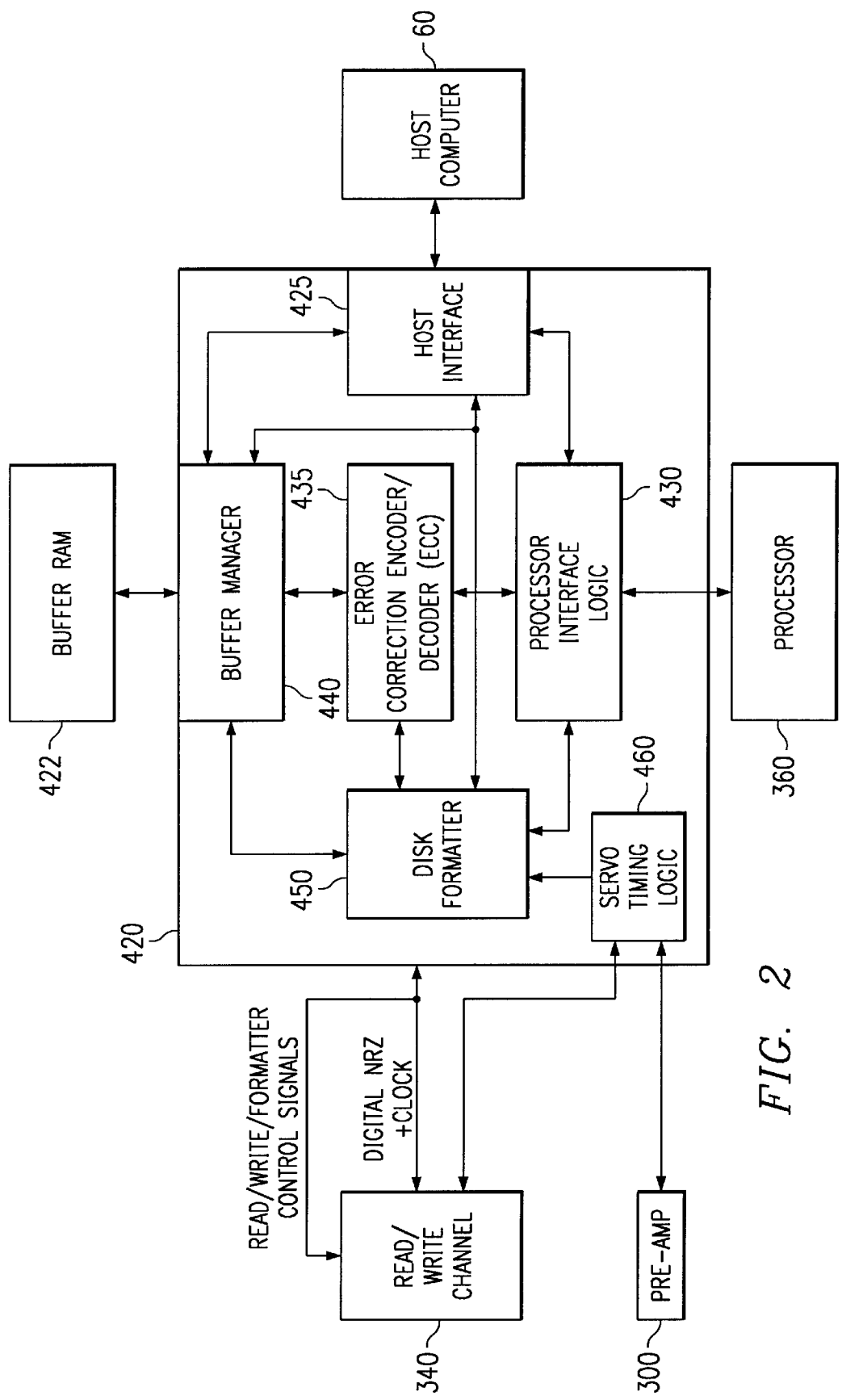
FIG. 2 shows the components of an interface controller which may be included within the hard disk drive system shown in FIG. 1.

FIG. 2 depicts an interface controller 420 of a type which may be included in the hard disk drive system 70 shown in FIG. 1. The interface controller 420 includes a host interface 425 which receives instructions and data sectors from the host computer 60. The host interface 425 also outputs data sectors to the host computer 60 in response to requests from the host computer 60.

The interface controller 420 includes a processor interface 430 by which the interface controller 420 interacts with the DSP 360. An error correction encoder/decoder (ECC) 435 is also included within the interface controller 420 which performs error detection and correction on data sectors read from the disk 260 and which generates error correction code when data is written to the disk 260. Data sectors are passed through the error correction encoder/decoder 435 under the control of a disk formatter 450 included within the interface controller 420. The buffer manager 440 arbitrates the requests from all of the other components of the interface controller 420 and controls the flow of data to and from the buffer memory 422.

The interface controller 420 also includes a disk formatter 450 which receives the digital data and clock output by the read/write channel 340 of FIG. 1. Significantly, the disk formatter 450 controls the formatting of data sectors and the reading and writing of data sectors to one of the magnetic disks 260 over which the pick-up head 280 is positioned in accordance with instructions received from the host computer 60 via the host interface 425. In addition, the disk formatter 450 also controls the operation of the error correction encoder/decoder (ECC) 435, with respect to the initiation and completion of the check bytes generation and detection process.

The servo timing logic 460 processes various servo fields in a servo wedge of the disk 260. In addition, the servo timing logic 460 includes a precision timing counter that counts from a sync field of the servo wedge to the next sync field which corresponds to the next servo wedge.

Figure 3:
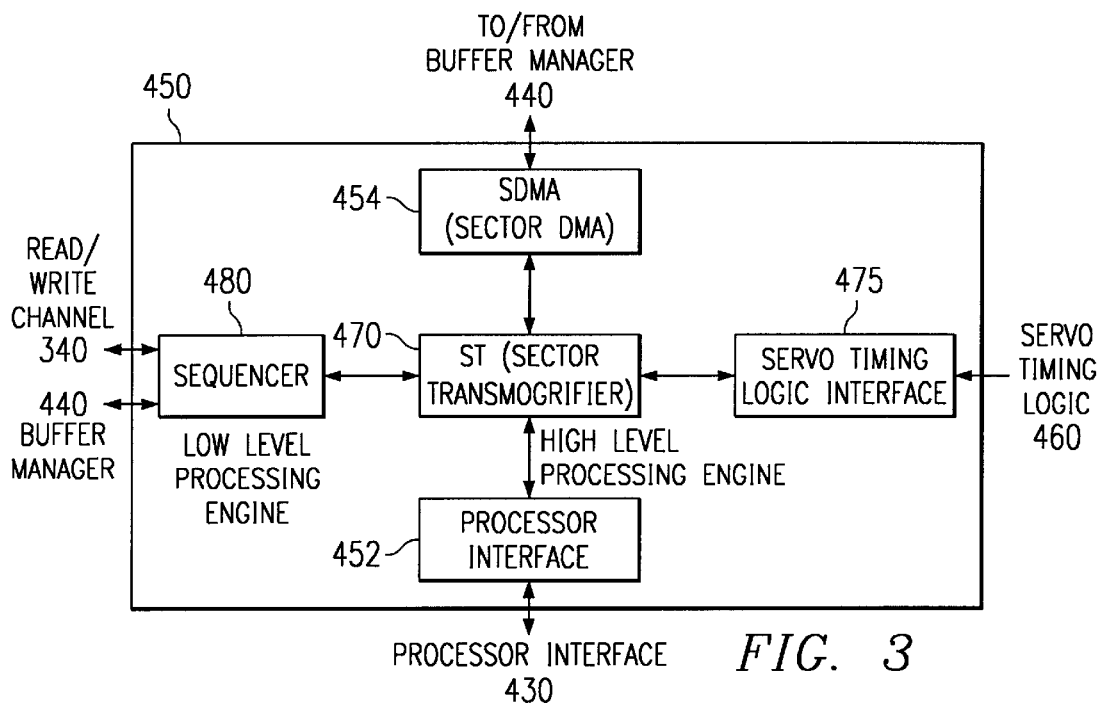
FIG. 3 shows a block diagram of a disk formatter.

FIG. 3 depicts the components of the disk formatter 450, which includes a DSP interface 452 and a sector direct memory access (SDMA) circuit 454. The DSP interface 452 provides an interface to the processor interface 430 to facilitate the transfer of data between the data formatter 450 and the DSP 360, whereas the SDMA circuit 454 provides an interface to the buffer manager 440 to facilitate the transfer of control data. The disk formatter 450 also includes a servo timing logic interface 475 which receives servo timing information from the servo timing logic 460. In particular, the servo timing logic interface 475 receives the output of the above-mentioned precision timing counter that counts from the sync field of the current servo wedge to the next sync field of the next servo wedge.

Significantly, the disk formatter 450 also includes a high level processing engine 470 and a low level processing engine 480, which is referred to as a Sector Transmogrifier and a Seqencer, respectively. A user programs the high level processing engine 470 with a set of instructions that includes at least two types of instructions. The first type includes instructions for moving data and performing arithmetic operations. The second type includes disk sequencing instructions for controlling disk operation.

Advantageously, the high level processing engine 470 can be programmed to accommodate different rotation positioning schemes which may correspond to an index pulse based wedge number identification system. Alternatively, the rotation positioning schemes may correspond to the unique binary sequence (UBS) based scheme, which identifies servo-wedge numbers while supporting an error tolerant capability. The unique binary sequence based scheme is described in detail in U.S. patent application Ser. No. 08/802,293, entitled "Position Detection Scheme for Headerless Disk Controller," which was filed on Feb. 18, 1997, by Schaffner et al., and which is incorporated herein by reference.

The use of the unique binary sequence may be further supplemented by the geometry per wedge (GPW) based formatting scheme, which defines the sector layout of each data wedge on a particular disk. The above-mentioned sequencer instructions, which are generated by the high level processing engine 470 "on the fly," are output to the low-level processing engine 480, as described more fully below.

The low level processing engine 480 executes the instructions provided by the high level processing engine 470 to implement the required disk operations. If the instructions relate to the reading of data from the disk or the writing of data thereto, then control signals are output from the low level processing engine 480 to the read/write channel 340 so that data can be transferred to or from the memory buffer 422 via a data path within the low level processing engine 480.

As noted above, the high level processing engine 470 generates instructions "on the fly" which are output to the low level processing engine 480. However, the time it takes to execute these instructions may be variable. The clock for the low level processing engine 480 is determined by the disk data transfer rate because low-level processing engine 480 controls the disk read/write operations.

In contrast, the high level processing engine 470 runs at a different clock speed which permits the processing of millions of instructions per second (MIPS). This ensures that the low level instructions output by the high level processing engine 480 are produced on time, and ensures that there is enough processing power to track the disk rotation position. In this regard, it is important to recognize that the high and low level processing engines 470 and 480 run concurrently and semi-independently.

Given that the high level processing engine 470 must communicate with the low level processing engine 480, it is important to achieve the highest processing bandwidth possible. However, there are several constraints placed on communication between the two processing engines 470 and 480 in addition to the fact that they run at different clock speeds.

In particular, the low-level processing engine 480 must execute instructions one after another without any gap, because the disk is rotating constantly. Accordingly, the time required to synchronize the flow of data between the two processing engines 470 and 480 using hand-shaking techniques would yield delays which are unacceptable because the low level processing engine 480 cannot complete an instruction, send status information back to the high level processing engine 470 and then wait for another instruction from the high level processing engine 470.

Moreover, the high level processing engine 470 must also track positional information, process tables and perform calculations, in addition to generating instructions for the low level processing engine 480. Therefore, the high level processing engine 470 cannot afford to spend time servicing status information received from the low-level processing engine 480.

In order to solve this problem, the present invention requires the use of an instruction queue in the low level processing engine. Advantageously, this instruction queue may be implemented as a first-in first-out (FIFO) random access memory (RAM) in the manner discussed below. The advantage provided by the instruction queue is that the need for synchronization between the high and low level processing engines 470 and 480 can be eliminated if the delivery of instructions to the low level processing engine is scheduled in accordance with the present invention.

Therefore, any delay due to synchronization is prevented. Preferably, a burst of instructions is sent from the high level processing engine 480 rather than just a single instruction at a time, the burst of instructions being a series of instructions output in rapid succession which saves the high level processing engine 480 bandwidth by eliminating the need for hand shaking for each instruction being stored in the instruction queue. In this way, the low level processing engine 480 will be able to process one instruction after another from the instruction queue. Moreover, the low-level processing engine 480 can sequentially process instructions for multiple sectors.

In order to discuss the implementation of the invention in greater detail, reference will be made to FIG. 4, which depicts the components of the disk formatter 450. The components of the disk formatter 450 are described in detail in the above-mentioned U.S. patent application entitled, "Programmable High Performance Disk Formatter for Headerless Disk Controller," now U.S. Pat. No. 6,167,461, which is incorporated herein by reference.

Figure 5:
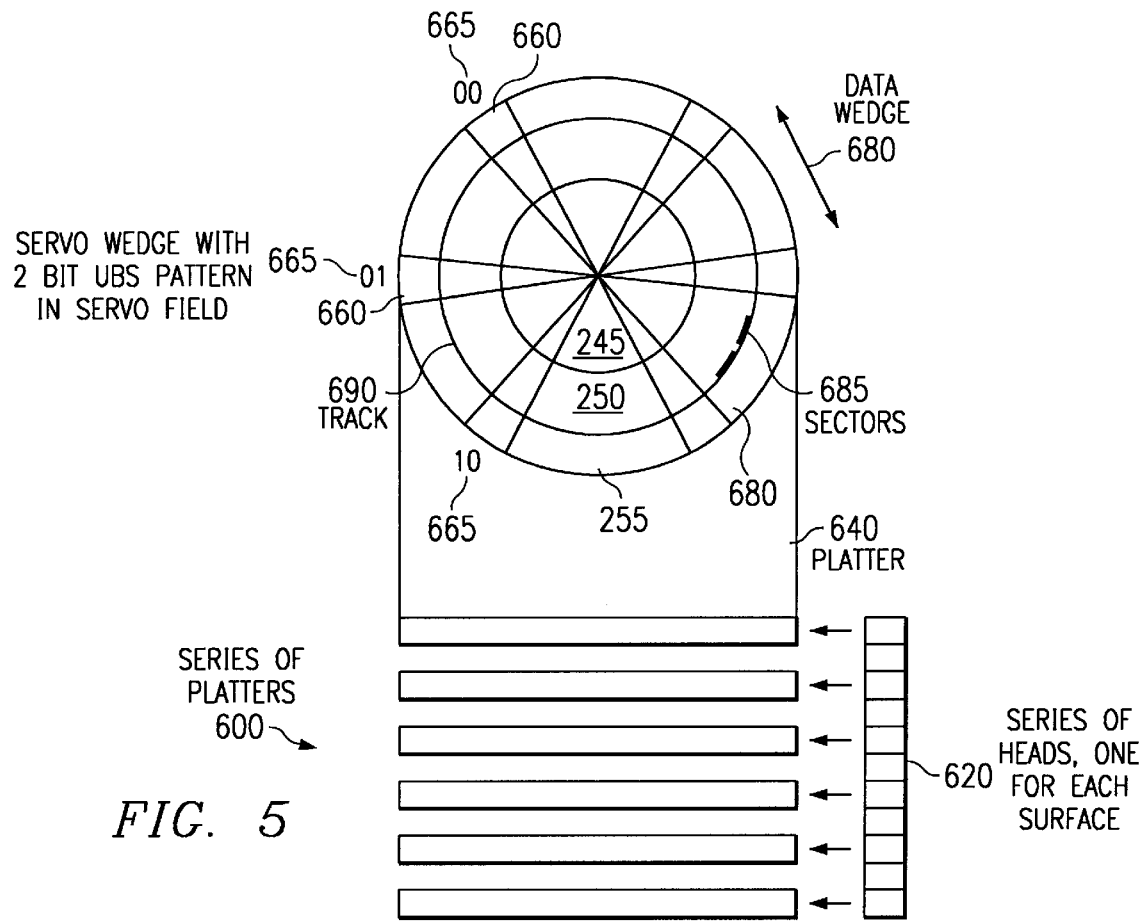
FIG. 5 shows a disk formatted in accordance with a wedge based disk formatting scheme.

Prior to discussing the components of the disk formatter 450, it is worthwhile to explore the features of a stack of disks 600 which could be subject to disk operations performed in accordance with the instructions generated by the high level processing engine 470, as shown in FIG. 5. The disks 600 (or platters) have corresponding heads 620 and are formatted in accordance with a wedge based formatting scheme.

As each of the disks 600 are formatted in t e same manner, only a single disk 640 will be addressed. This disk 640 includes a number of servo wedges 660 and corresponding data wedges 680. The servo wedges 660 include data which identifies each wedge. By way of example, the data included in each servo wedge 560 may include a two-bit field 665, as shown in FIG. 5, which in one revolution of the disk forms a unique binary sequence (UBS) per platter surface. Alternatively, the data included in each servo wedge 660 may be a one bit index field, which assumes a value of one for a single servo wedge of the disk.

Each data wedge 680 includes sectors 685 which are disposed along at least one track 690. In addition, the servo and data wedges are segmented in zones 245, 250 and 255 which each have a constant number of sectors along the tracks extending through those wedges. However, this constant number of sectors could be different for different zones 245, 250 and 255.

In this regard, the wedge based formatting scheme may utilize geometry per wedge (GPW) based sector layout information describing the sector layout within a particular zone 245, 250 and 255 of a data wedge 680 which is uniquely defined by the entry of a GPW table.

Referring to FIG. 5, there are six GPW entries per zone, with three zones. Accordingly, there are eighteen entries within a particular GPW table. Each GPW entry includes multiple fields, which define, for example, the first sector number in a data wedge, the number of sector pulses, and specific sector pulse timing information.

Figure 4A:
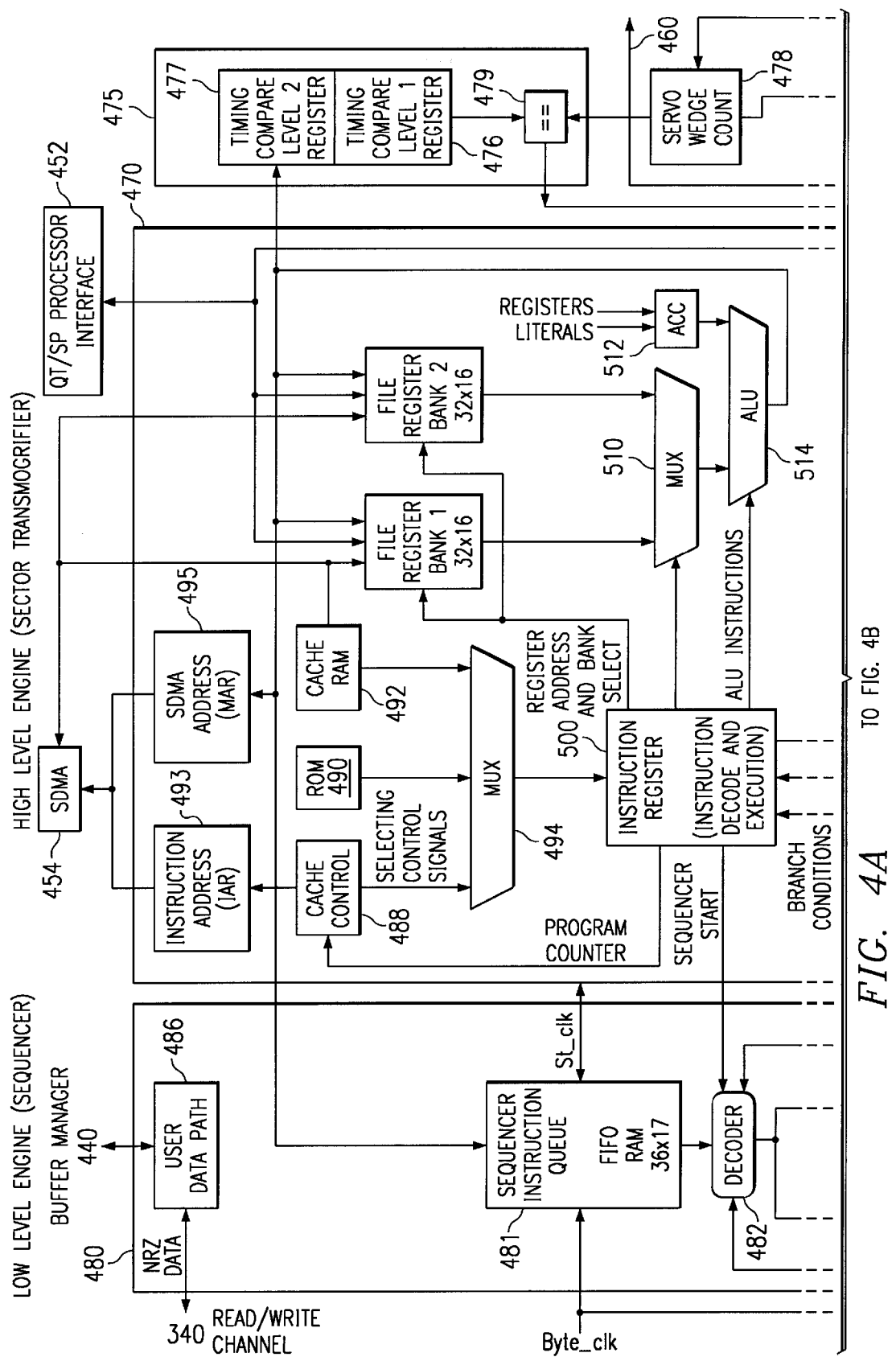
FIG. 4 shows a block diagram of the low-level processing engine and the high level processing engine.
Figure 4B:
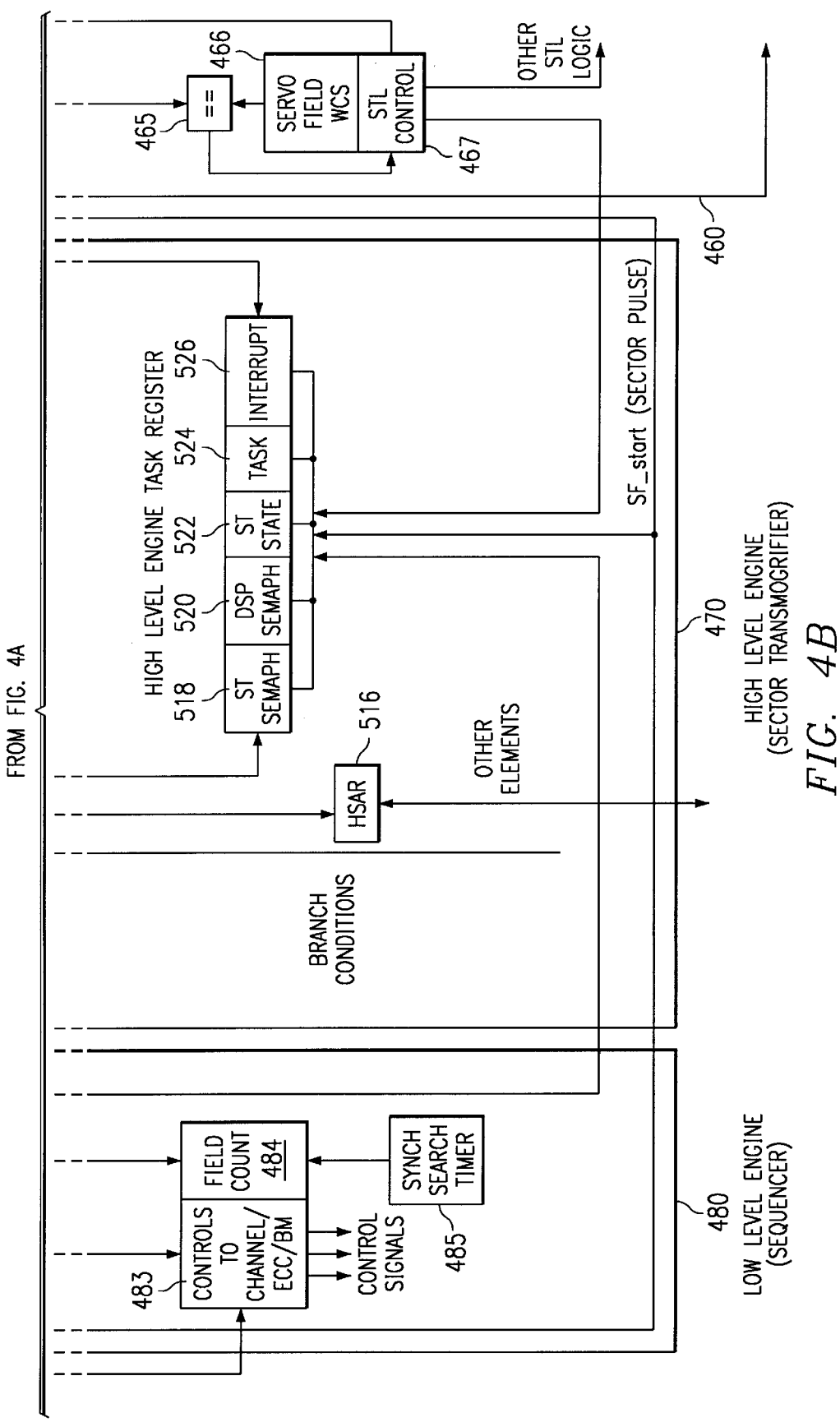

As shown in FIG. 4, the high level processing engine 470 includes an instruction execution unit 500 which receives instructions via a multiplexer 494 from an instruction cache 492, which may be implemented as embedded RAM, and an embedded read only memory (ROM) 490, which stores time critical routines. A hardware status and action register 516 is also included within the high level processing engine 470 which provides a two way communications channel between the high level processing engine 470 and other elements of the interface controller 420.

The above-mentioned instruction cache 492 receives instructions from the buffer memory 422 via the SDMA 454. To facilitate the receipt of an instruction from the buffer memory 422, an instruction address register (IAR) 493 is provided which contains the address of the instruction which is to be stored in the instruction cache 492. The instruction execution unit 500 will also access the buffer memory 422 to retrieve control information (i.e., rotation positioning information, such as unique binary sequence data, or sector layout information, such as GPW tables) via the SDMA 454. To facilitate the retrieval of control information from the buffer memory 422 via the SDMA 454, an SDMA address register (MAR) 495 is provided that contains the buffer address of the control information to be stored in one of the file registers 496 or 498.

The output of the multiplexer 494 is controlled by a selection signal received from a cache control 488. The instruction execution unit 500 decodes machine level instructions to execute a number of tasks such as moving data into file registers 496 and 498, or modifying file register and accumulator data via the arithmetic logic unit (ALU) 514. Significantly, an additional task would include generating low level instructions which are output to the low level processing engine 480. Each of these tasks are carried out in response to a request from the host computer 60 via the host interface 425 to perform a specific disk operation on a predetermined sector or sectors, such as the transfer of data to or from a particular disk.

In order to read or write data to a predetermined sector of a particular disk, the high level processing engine 470 must precisely coordinate the generation and transfer of low-level commands to the low level processing engine 480. This coordination is aided by the generation of sector pulses which signify the beginning of corresponding sectors. Sector pulses are generated in accordance with sector timing compare values calculated by a high-level engine program whose instructions are executed by the instruction execution unit 500. The manner in which sector timing compare values are used to generate sector pulses is described below.

Based on the zone number and wedge number, the high level processing engine 470 calculates a corresponding address of a GPW table in the buffer memory 422. The GPW table includes a number of GPW entries which can be fetched into the file registers 496 or 498 using high level memory access instructions.

In addition to the current wedge number, file registers 496 or 498 also store a sector timing compare value which is updated upon generation of each sector pulse within the current wedge or under the control of the above-mentioned high level processing engine program.

Assuming that the predetermined sector is the first sector within a particular wedge then the burst of instructions for that sector will be transmitted at least one sector prior to the arrival of the predetermined sector at the signal pick-up head 280, the burst of instructions being transmitted after the occurrence of a sector pulse which is generated in the manner described below. However, before the sector pulse can be generated for the sector preceding the predetermined sector, it must be scheduled in accordance with the present invention through the use of a sector timing compare value which represents the displacement in time of the start of a sector from the start of the wedge in which the sector is included. Because the predetermined sector is the first sector of a wedge, the sector preceding the predetermined sector falls within the wedge preceding the wedge in which the predetermined sector is located.

In contrast, if the predetermined sector is at least the second sector within the wedge then the burst of instructions fir that sector would be generated in the wedge in which the predetermined sector is located.

The sector timing compare value generated by the high level processing engine 470 is received by a servo timing logic interface 475 which is also included within the high level processing engine 470. However, this component of the high level processing engine 470 has been included in a separate functional block to better illustrate the operation of the disk formatter 450.

According to the present invention, the sector timing compare value for the current sector being searched for (i.e., the above-mentioned preceding sector pulse) is stored in the register 476 (referred to as a level one register) prior to the time the start of that sector passes by the signal pick-up head 280. Preferably the sector timing compare value would be generated by the high level processing engine 470 and stored in register 477 (referred to as a level two register) two sectors before the start of the sector passes by the signal pick-up head 280. Both the level one and level two registers 476 and 477 are included in the servo timing logic interface 475.

The sector timing compare value for the current sector being searched for is compared with the output of a servo wedge counter 478 in the servo timing logic 460 by a comparator 479 in the servo timing logic interface 475. The servo wedge counter 478 counts the time elapsed precisely from one servo synchronization field of a current servo wedge to the next servo synchronization field of the next servo wedge.

When the comparator 479 determines that the output of the servo wedge count 478 equals the sector timing compare value for the current sector being searched for, a sector pulse is generated by the comparator 463. Thereafter, the value stored in the level two register 477 is transferred to the level one register 476, and so becomes the sector timing compare value for the current sector being searched for in anticipation of generating the next sector pulse. The high level processing engine 470 then calculates and stores a sector timing compare value for the next sector to be searched for in the register 477.

As for the remaining components of the servo timing logic 460, they include a servo field WCS 466 that provides compare values to detect data in the servo field of the servo wedge. By way of example, the data may include unique binary sequence data bits. The servo timing logic 460 also includes a servo timing logic control unit 467 that provides control status signals to the task register 518, 520, 522, 524, and 526, as well as other servo timing logic components (not shown) based on data within the servo field. These control signals may include unique binary sequence data and strobe signals which are generated when the unique binary sequence data is detected.

In addition, the servo timing logic 460 includes a comparator 465 for comparing the servo field compare values from the servo field WCS 466 to the value stored in the servo wedge counter 478. The servo wedge counter 478 is reset periodically upon detection of the servo synchronization field within each new servo wedge.

Figure 6:
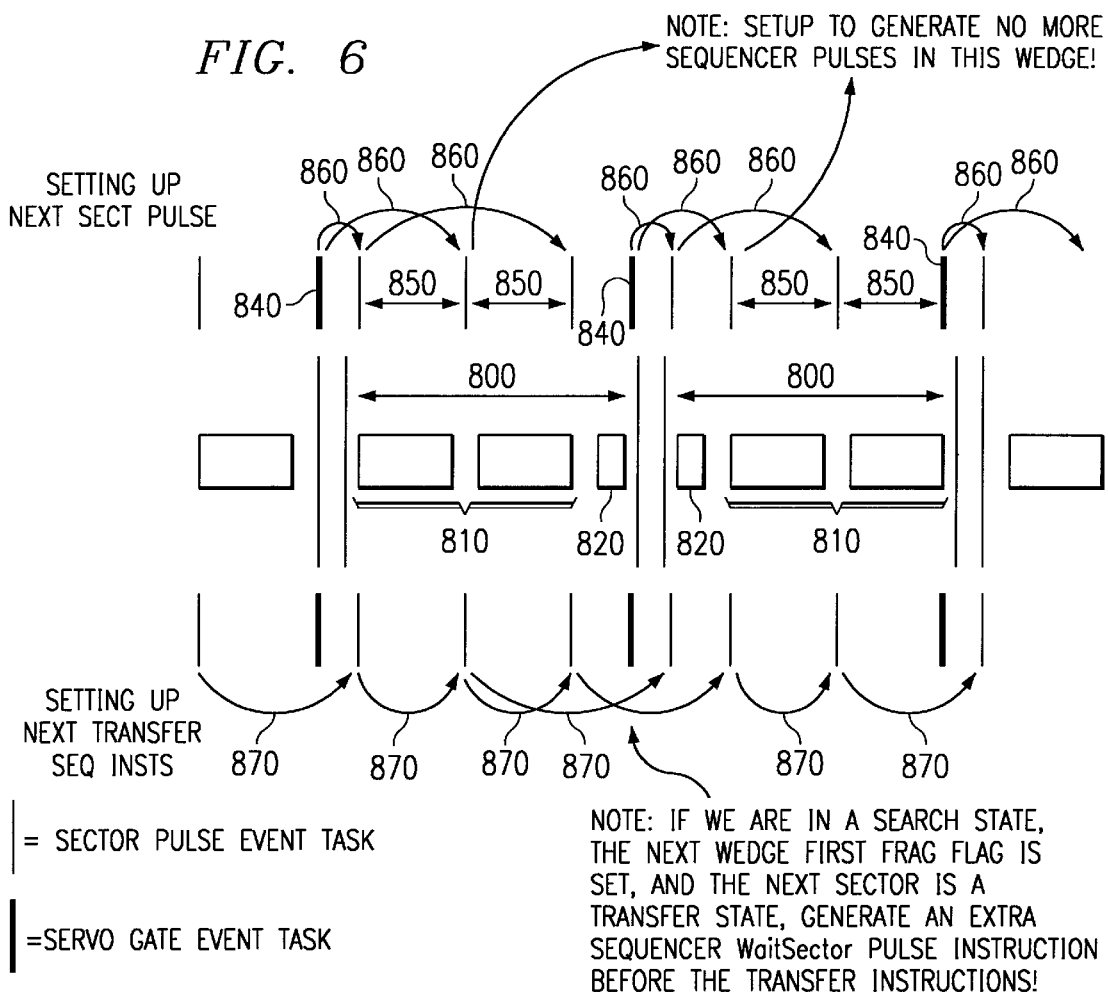
FIG. 6 is a timing diagram for multiple consecutive data wedges of a magnetic disk formatted using the geometry per wedge (GPW) based disk formatting scheme which illustrates an aspect of the present invention.

An example of the scheduling of the above-mentioned sector timing compare values and instructions has been provided above. However, FIG. 6 shows a timing diagram which illustrates the scheduling concept more generally. In particular, two complete wedges 800 are shown. Each wedge includes two complete sectors 810 and at east one fragment 820 of a sector. Servo wedge pulses 840 (i.e., servo gate events) which indicate the start of a wedge are followed by sector pulses 850 (i.e., servo pulse events) which indicate the start of a sector or fragment thereof.

Above and below each wedge in the figure are a series of curved arrows 860 and 870, which illustrate the scheduling of sector timing compare values and low level instruction generation, respectively. Each sector pulse 850 is preferably preceded by the generation of a sector timing compare value at least two sector pulses 850 prior to the occurrence of that sector pulse 850, with the exception of the first two sector pulses following a servo wedge whose timing values are generated at a servo wedge pulse 840, as shown by the arrows 860.

In contrast to the scheduling of sector pulses, the scheduling of a burst of instructions occurs one sector pulse 850 prior to the occurrence of the sector pulse 840 for a predetermined sector which is to be subject to a particular disk operation, as shown by the arrows 870. This is the case even if the sector pulse for the preceding sector falls within the wedge preceding the wedge in which the predetermined sector is located. In the case of a pair of sector fragments 820, the burst of instructions for both sector fragments 820 must occur one segment prior to the occurrence of the sector pulse for the first fragment 820, as shown by the arrows 870 directed to those fragments 820.

Once a sector pulse has been generated it is output to a task register 518, 520, 522, 524 and 526. Based on the value of the bits stored in the task register 518, 520, 522, 524 and 526, the high level processing engine 470 will then carry out specific tasks using various user-specified subroutines. These tasks may include outputting another sector timing compare value to the level two register 477, or sending a burst of instructions to the lower level processing engine 480 so that a predetermined sector is subject to a particular disk operation if the sector pulse task bit in the task register 518, 520, 522 524, and 526 indicates that a sector pulse has been generated. In this regard, it is the high level processing engine 470 program which detects the sector pulse task bit.

The instructions output by the high level processing engine 470 are received by the low level processing engine 480 and stored in the instruction queue 481, which also receives as input the clock (ST_START), which is generated as a result of executing a sequence start instruction by the high level processing engine 470. The sequence start signal indicates that the low level processing engine 480 can begin the execution of one or more instructions associated with, for example, a request by the host computer 60 to read or write one or more sectors of data. The decoder 482 also receives sector pulses output by the comparator 479 which trigger the execution of low level instructions (which require the detection of sector pulses) output by the instruction queue 481.

Preferably, the instruction queue 481 can be a 36X17 FIFO RAM. In this case, the size of the buffer memory 481 is a function of the word length of each low level instruction (17 bits) and the fact that one sector of low level instructions for various types of sector formats may require space for up to twelve words. Accordingly, a queue of thirty-six words can accommodate instructions for a sector plus two fragments of a sector.

One twelve-word segment of the thirty-six word queue is employed for the instructions being processed for a particular sector, whereas the remaining two twelve-word segments of the thirty-six word queue are employed for the instructions which will be stored for a sector following that sector. The reason for two additional twelve-word segments stems from the fact that a single sector could be parsed into two fragments which reside in separate wedges of a particular disk.

Each of the fragments requires its own group of instructions. Thus, with respect to the allocation of space within the instruction queue 481, the fragments are treated as separate sectors whose total data field length equals the length of a full sector of data. Therefore, where sector fragments are included within the wedges of a particular disk, the instruction queue 481 should include space for at least three separate sectors worth of instructions. However, in the case in which sector fragments are not employed, space need only be provided within the instruction queue 481 for two sectors worth of instructions.

When a sequence start signal, which is generated upon the execution of the sequencer start instruction by the high level engine 470, is received by the decoder 482, it outputs a queued instruction to the decoder 482 which decodes the instruction and outputs the result to a register 483. The register 483 outputs control signals to the read/write channel 340 and the buffer manager 440 when a read or write task must be completed for a predetermined sector.

In addition, the register 483 will output control signals to the error correction encoder/decoder (ECC) 435 if error correction is required for a specific sector of data. The register 484 includes a value which represents the time that a particular control signal will be asserted, while the timer 485 acts as an interrupt to the register 484, generating an interrupt when a predetermined period of time has lapsed and a synchronization pattern has not been detected in the NRZ data received from the read/write channel 340 during a read disk operation.

Following the receipt of a sequencer stop instruction from the high level processing engine 470 and the subsequent execution of that instruction by the decoder 482 of the low level processing engine 480, the decoder 482 will output status information to the task register 518, 520, 522, 524, and 526 indicating that a particular sequence of instructions corresponding to at least one sector has been completed. The sequencer stop instruction is usually the last instruction associated with the execution of a particular disk operation.

The low-level processing engine 480 also includes a data path 486 so that user data can be output or received from the data formatter 480 to either the read/write channel 340 or the buffer manager 440.

Figure 7:
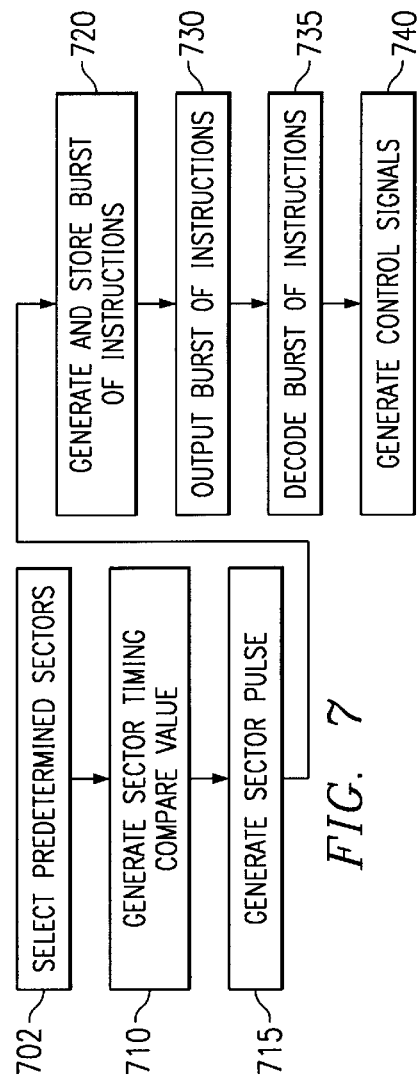
FIG. 7 is a flow chart depicting the steps of a method of the present invention which may be implemented in software.

The present invention also embodies a method for providing for efficient communication between high and low level processing engines of a disk formatter for formatting a disk which stores data. Turning to FIG. 7 which depicts a flow chart diagram for the inventive method, in step 702 a predetermined sector of a disk having tracks disposed thereon is selected for being subject to a particular disk operation, the disk being formatted in accordance with a wedge based formatting scheme of the type illustrated in FIG. 5.

In step 710, sector timing compare value, are generated by the high level processing engine which correspond to the locations of the predetermined sector and those sectors within the wedge which precede the predetermined sector. These sector timing compare values are measured based on the amount of time from the beginning of the servo wedge synchronization field to the start of a sector.

The timing associated with the generation of these sector timing compare values is important, insofar as the values are used to generate sector pulses in step 715 which indicate the start of a particular sector. These sector pulses are each used to trigger the generation of a burst of low-level instructions which is output by the high level processing engine 470 (shown in FIG. 4) and stored in an instruction queue 481 (shown in FIG. 4) of the low level processing engine in steps 720 in accordance with a clock signal of the high-level processing engine 470. As noted above in connection with FIG. 6, the sector timing compare values are generated repeatedly for each succeeding sector pulse.

Significantly, the burst of instructions used to implement a particular disk operation for a predefined sector must be generated at least one sector prior to the arrival of the beginning of the predetermined sector at the signal pick-up head 280. To ensure that the burst of instructions is output at the appropriate time (i.e., contemporaneously with the generation of the sector pulse which corresponds to the sector preceding the predetermined sector), the sector timing compare value for the sector preceding the predetermined sector is, generated prior to the time the sector pulse for the preceding sector is to be generated. This is because the sector timing compare value is compared with the output of a counter (i.e., the servo wedge counter 478 ) prior to the generation of the sector pulse, as noted above in connection with the discussion of FIG. 4.

Preferably, the sector timing compare value for the sector preceding the predetermined sector will be calculated by the high level processing engine 470 two sectors prior to the time the sector pulse for the preceding sector is to be generated, with one exception. When the timing compare values for the first two sector pulses are generated, they will be generated at the servo gate event rather than the sector pulse event. The reason for this stems from the fact that a small fragment may follow the servo wedge so closely that there is insufficient time for the sector timing compare value calculation to be completed.

In step 730, the burst of instructions is output one at a time from the memory buffer 481 and is decoded in step 735. Thereafter, control signals are generated in step 740 which correspond to a particular disk operation.

Figure 8:
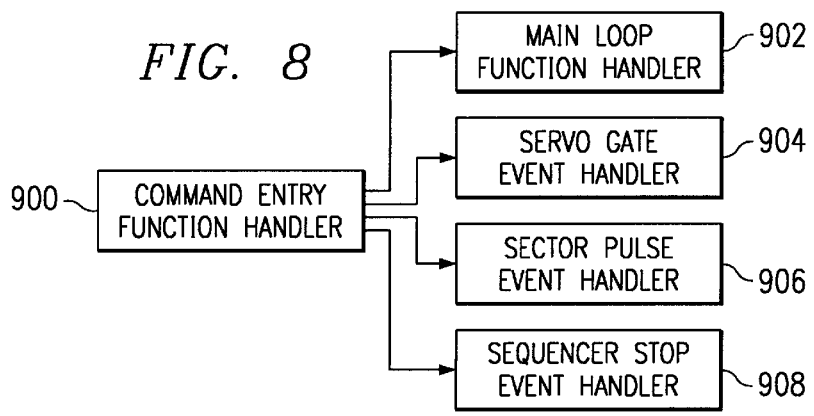
FIG. 8 is a diagram which illustrates the functional components of the present invention.

Turning now to a discussion of the high level processing engine program, it is worthwhile to note that the program contains five main functional components as shown in FIG. 8. The first main functional component is called the command entry function handler 900, which processes each command and initializes file registers within the high level processing engine 470. The command entry function handler 900 also sets function pointers to the remaining components of the high level processing program. Thereafter, the command entry function 900 branches to a main loop function handler 902 via a main loop function pointer. Although the command entry function handler 900 has been referred to in the singular, the command entry function handler 900 actually includes separate command entry function handlers for all supported commands. Each of these command entry function handlers is stored within the buffer memory 422 associated with the interface controller 420 shown in FIG. 2.

The main loop function handler 902 is another one of the five main components of the high level processing engine program. However, the main loop function handler 902 is stored within ROM 490 so that it can be quickly accessed. The main loop function handler 902 performs event detection and dispatching to each of the remaining event handlers discussed below.

The high level processing program includes a third function event handler, the servo gate event handler 904, which is branched to by the main loop function handler 902 in response to a servo gate event (i.e., the detection of a servo wedge pulse). The servo gate event handler 904 handles all tasks specific to servo gate events. The servo gate event handler 904 includes three sub-components or separate servo gate event handlers. There is a servo gate event handler for sector based commands, a servo gate event handler for wedge base commands, and a default servo gate event handler for clearing a particular servo gate event. When complete, these three servo event handlers all branch back to the main loop function pointer. The servo gate event handler 904, including its sub-components, is stored in the ROM 490 of the high level processing engine 470.

The fourth functional component is the sector pulse event handler 906 which is branched to by the main loop function handler 902 in response to a sector pulse event, i.e., the detection of a sector pulse). The sector pulse event handler 906 handles all tasks specific to sector pulse events. The sector pulse event handler 906 is stored in the ROM 490 of the high level processing engine 470. The sector pulse event handler 906 itself comprises three sub-components or separate sector pulse event handlers. In particular, there is a sector pulse event handler for sector based commands, a sector pulse event handler for wedge based commands, and a default sector pulse event handler for clearing a particular sector pulse event. Upon completion of any of the sector pulse event handlers, that sector pulse event handler will branch back to the main loop via the main loop function pointer.

The fifth functional component of the high level processing engine program is the sequencer stop event handler 908 which is branched to by the main loop function handler 902 in response to a sequencer stop event. The sequencer stop event handler 908 handles the clean up following the execution of commands associated with a particular disk operation. By way of example, the sequencer stop event handler 908 determines command status and posts semaphores to the digital signal processor 360 from the high level processing engine 470. The sequencer stop event handler 908 is stored within the buffer memory 422 associated with the interface controller 420.

Figure 9:
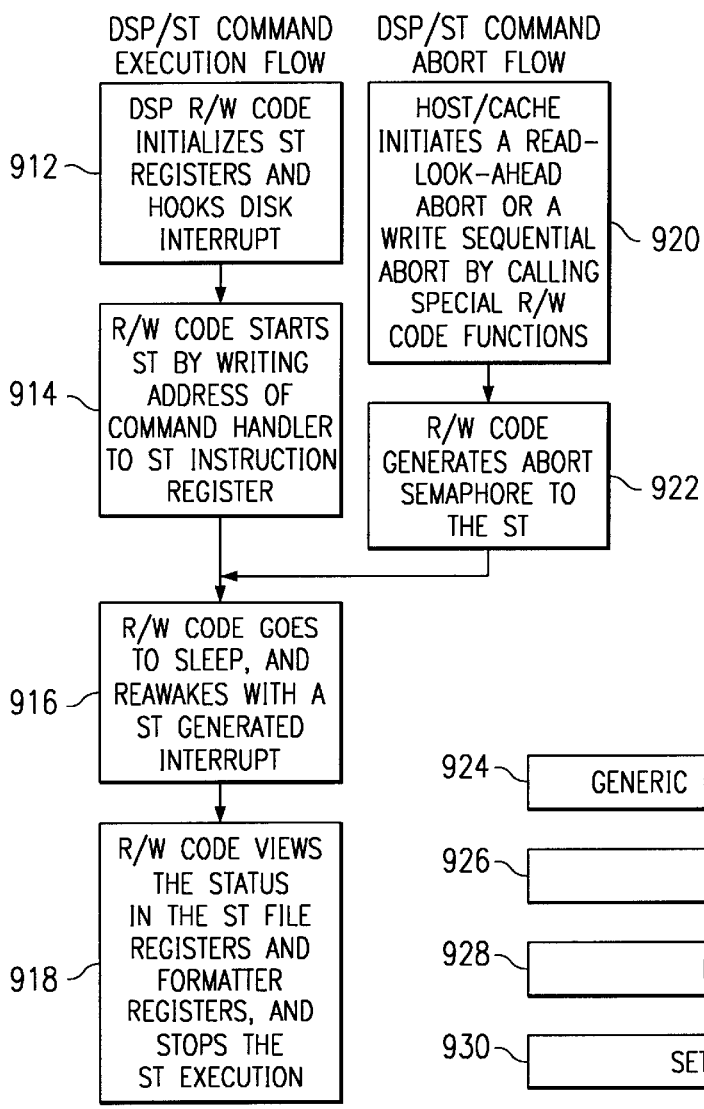
FIG. 9 is a flow chart which illustrates the manner in which the digital signal processor and the high level processing engine communicate.

Having mentioned the functional components of the high-level processing engine program, it is worthwhile to discuss the interaction of the digital signal processor 360 and the high-level processor engine 470 with respect to the execution of the high level processing engine. This interaction can be categorized in terms of the execution of commands and the abortion of commands in progress as shown in FIG. 9.

Regarding the digital signal processor 360 to high level processing engine 470 command execution flow, in step 912 the digital signal processor 360 initializes read/write codes within the high level processing engine's registers and provides for a disk interrupt capability. By way of example, the DSP 360 will initialize the file registers 496 or 498 with the parameters identified below in TABLE 1.

| Input Register | Description of Initialized Value |
| --- | --- |
| PBA | Physical block address of the starting sector. |
| LBA | Logical block address of the starting sector. |
| Target Sector | The identification (ID) of the target sector for the beginning of the command. |
| Transfer Length | Requested transfer length in sectors. ST will terminate the command when decremented to zero. |
| NTSPBA | Next track start physical block address. Used to determine if following PBA is on the next track. |
| NBPBA | Next bad physical block address. Used for defect skipping. |
| NGPBA | Next good physical block address. Used in defect skipping to identify the next good PBA following a bad PBA. |
| GPW Table Base Address Pointer | Buffer address of the base of the current GPW table. Used to retrieve desired GPW entries. |
| First Phase Lock Oscillator (PLO) Delay Time | Time (in servo clock cycles) from the servo synch field to the first sector pulse as a function of zone. |
| Target Search Length | Time for a target sector search before timing out and posting an error. |
| Sector Length | Length of a full data sector in servo clock cycles as a function of zone. |
| Servos Per Track | Number of servo bursts per track. Used while converting a tracking wedge number to a transfer wedge number using skew factor. |
| Track Skew | Amount of skew in wedges for the current track. |
| Read Gate Delay | Number of bytes to wait after sector pulse before asserting read gate as a function of zone. |
| Skip Length | Number of bytes to skip per Skip Bytes instruction during defect skipping. |

Following step 912, step 914 is performed in which a particular read/write code starts the high level processing engine 470 by writing the address of the command handler discussed above to the high level processing engine's instruction register.

In step 916, the read write code goes to sleep and reawakens with a high level processing engine 470 generated interrupt. Thereafter, in step 918, the read write code views status information stored in the high level processing engine's file registers 496 or 498 and formatter registers, and stops the execution of the high level processing engine 470.

With regard to the DSP 360 to high level engine 470 command abort flow, the host interface 425 shown in FIG. 2 initiates a read look ahead abort or a write sequential abort by calling special read/write code functions in step 920. Thereafter, in step 922, the read/write code generates an abort semaphore to the high level processing engine 470. Steps 916 and 918 are then performed in the manner discussed above.

Figure 10:
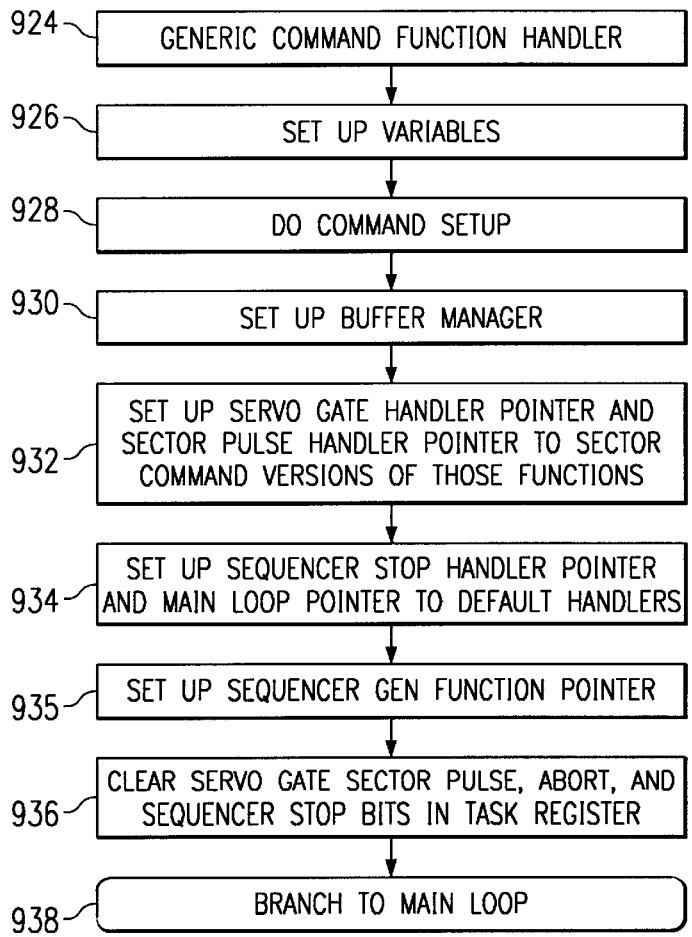
FIG. 10 is a flow chart which shows the process associated with executing a generic command handler.

FIG. 10 shows the steps associated with a generic command function handler 924. Initially, in step 926 variables are set up including any state flags. Thereafter, in step 928, a command set up is performed in which the state of the high level processing engine is switched to the target search state described more fully below in connection with FIG. 17.

Following step 928, the buffer manager is set up for the particular disk operation requested by a particular command in step 930. Thereafter, in step 932, the servo gate handler pointer and the sector pulse handler pointer are set up for the sector command version of those functions.

In step 934, the sequencer stop handler pointer and the main loop pointer are set to their default handlers. Thereafter, in step 935, the sequencer generation function pointer for a particular disk operation is set up. Following step 935, step 936 is performed in which the servo gate event, sector pulse event, abort semaphore an sequencer stop event bits are cleared in the task register 518, 520, 522, 524 and 526. Thereafter, step 938 is performed in which the command function handler branches to the main loop handler 902 via the main loop function pointer.

As noted above, there is actually a separate command entry function handler for each supported command. The sector based command handlers in the preferred embodiment may include CMD_READ, CMD_READ_VERIFY, CMD_WRITE, CMD_FORMAT, CMD_READ_LONG and CMD_WRITE_LONG.

The CMD_READ handler sets the function pointer for the instructions that implement a standard read command to read sectors from the media and write them to buffer 422, including error correction code (ECC) detection and correction, if enabled.

The CMD_READ_VERIFY handler sets the, function pointer for the instructions that implement a read command to read sectors from the media and discard them, including performance of error correction code (ECC) detection and correction, if enabled. This handler will initialize the file registers with the parameters which are similar to those initialized for the standard read command (above).

The CMD_WRITE handler sets the function pointer for the instructions that implement a standard write command to write the data from the buffer 422 to the media and, including ECC generation and appending to each block of data, if enabled. This handler will initialize the file registers with the parameters which are similar to those initialized for the standard read command.

The CMD_FORMAT handler sets the function pointer for the instructions that implement a format command similar to the write command, except that instead of data from the buffer, the data to be written is a single-byte pattern specified in a high level engine file register. Additionally, ECC is generated and appended to each block of data. This handler will initialize parameters in the file registers similar to that for the write command.

The CMD_READ_LONG handler sets the function pointer for the instructions that implement a read command for a single block, plus its entire ECC, into the buffer. This handler will initialize the file registers with same parameters as for the standard read command, with several changes. The Transfer Length parameter will be set to one for this command because a single block is being read. The NBPBA will be set to an unattainable value and the NGPBA and Skip Length will be left uninitialized because there will be no defect skipping.

The CMD_WRITE_LONG handler sets the function pointer for the instructions that implement a write command for 512 bytes of data, plus ECC data, onto the media. Thus, the transfer length is limited to one. This handler will initialize the file registers with same parameters as for the standard write command, with several changes. The Transfer Length parameter will be set to one for this command because only 512 bytes are being written. The NBPBA will be set to an unattainable value and the NGPBA and Skip Length will be left uninitialize since there will be no defect skipping.

Figure 11:
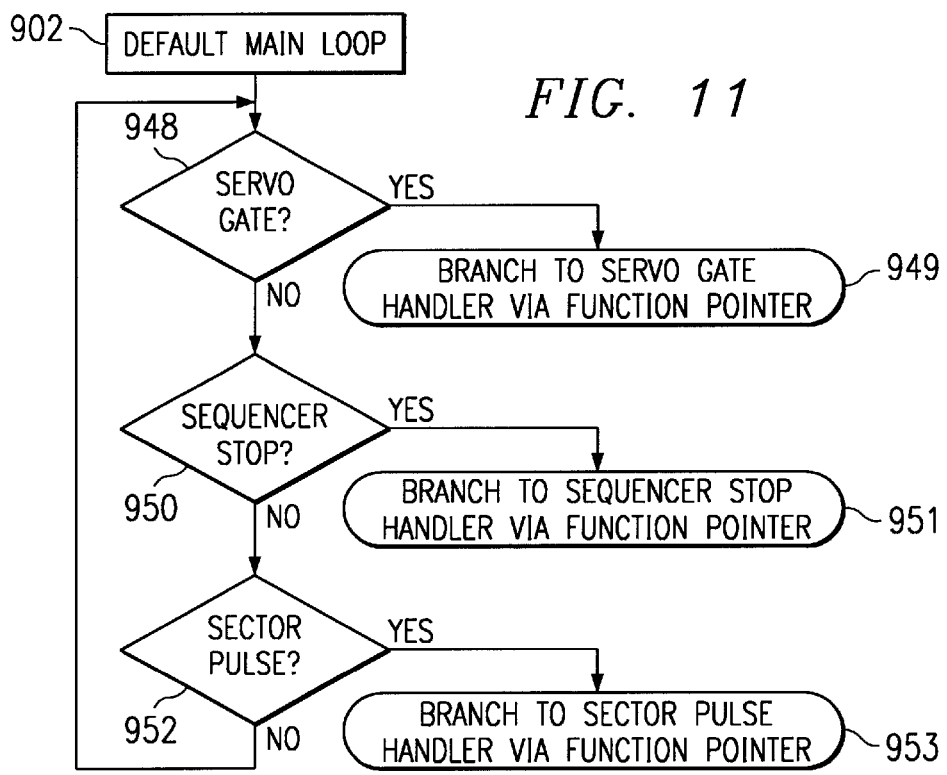
FIG. 11 is a flow chart which shows the process associated with executing a main loop handler in accordance with the present invention.

FIG. 11 depicts the steps of the main loop handler 902. In step 948 it is determined whether a servo gate event has occurred. If a servo gate event has occurred, the main loop 946 branches to the servo gate handler for sector based commands via a function pointer. If a servo gate event has not occurred, in step 950 it is determined whether a sequencer stop instruction has been generated. If a sequencer stop instruction has been generated, then in step 951 the default main loop branches to the sequencer stop handler via a function pointer. If a sequencer stop instruction has not been generated, then in step 952 it is determined whether a sector pulse event has occurred. If a sector pulse event has occurred, then in step 953 the default main loop branches to the sector pulse handler via a function pointer. Otherwise, step 948 is repeated.

Figure 12:
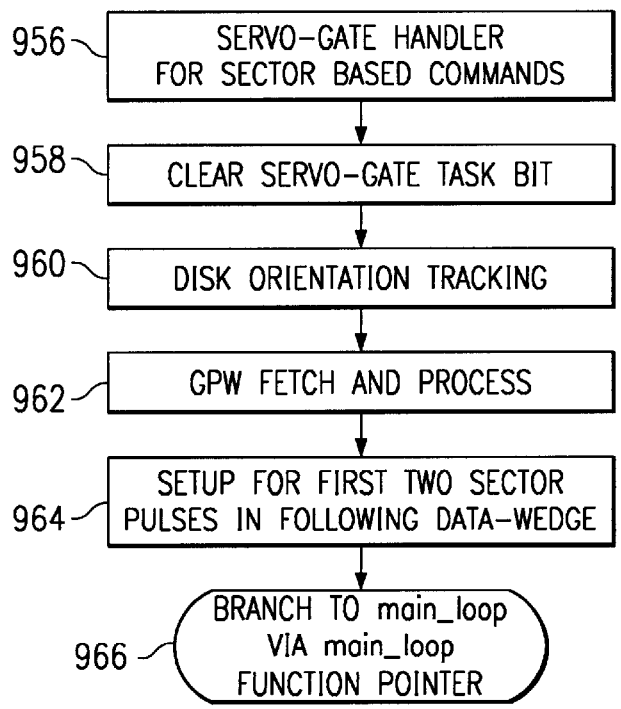
FIG. 12 is a flow chart which shows the process associated with executing a servo-gate handler for sector based commands.

FIG. 12 depicts the servo gate handler 956 which processes servo gate events for sector based commands. In step 958, the servo task bit is cleared because the high level processing program is now processing the servo gate event which triggered the use of the servo gate handler 956. Thereafter, in step 960, disk orientation tracking is performed which relates to how the high level processing engine 470 receives rotational orientation information from the DSP 360. Thereafter, in step 962 GPW fetching and processing is performed so as to ensure that two GPW entries from the GPW tables are stored in the file register 496 and 498. The two GPW entries correspond to the current and next data wedges.

Thereafter, in step 964 the first two sector pulses are set up for the following data wedge. Accordingly, the first two sector pulses always follow a servo gate event, whereas all subsequent sector pulses within a data wedge are set up by the sector pulse event handler, as discussed below.

The timing information required to generate the first sector pulse in a wedge comes from a table and is based on the specific zone in which the sector corresponding to the sector pulse is situated. Timing information for the first sector pulse need not be included within the GPW entry because it always occurs at a fixed location in a data wedge with respect to the servo gate event.

In contrast, the timing information required to generate the second servo pulse in a data wedge always comes from a particular GPW entry. The reason for this is that the second sector pulse can start at various locations within a data wedge based on whether the data wedge includes a fragment.

Following step 964, the servo gate event handler 956 branches to the main loop via the main loop function pointer in step 966.

Figure 13:
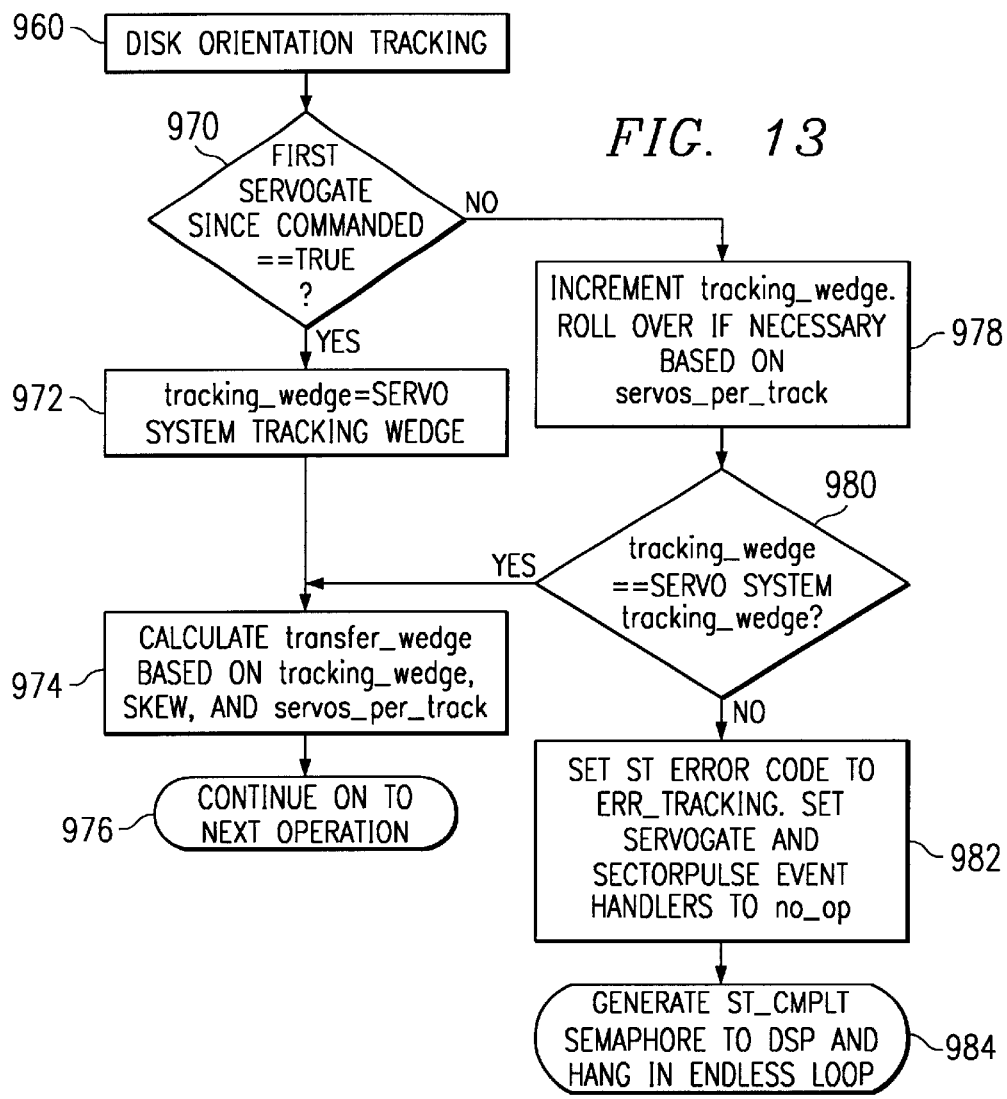
FIG. 13 is a flow chart which shows the process associated with performing disk orientation tracking.

FIG. 13 depicts the steps which occur during disk orientation tracking 960. In particular, in step 970 it is determined whether the first servo gate event has occurred since a command was generated. This is determined by recourse to information stored in the file register 496 or 498. In particular, a servo gate bit is set when a particular command is first processed by the command entry function which indicates that the first servo gate event detected will correspond to the first servo gate detected since a particular command was processed. By way of example, the servo gate bit's value can be set to one indicating TRUE, or a value of zero indicating FALSE. The reason why the first servo gate event must be treated differently stems from the fact that servo system tracking wedge information can be retrieved from the servo system.

Accordingly, if a servo gate event is the first servo gate event to occur since a command has been issued, then in step 972 the tracking wedge number is set equal to the servo system tracking wedge number so that the relative position of the signal pick-up head over the disk can be ascertained.

In step 974, the transfer wedge is calculated based on the tracking wedge number, skew and the number of servo pulses per track. Thereafter, in step 976 the next operation is performed which corresponds to the fetching and processing of GPW entries, as described above.

Once the required rotational tracking information has been ascertained, it is no longer necessary to request this information from the DSP 360, as the value can be ascertained with recourse to a counter which is incremented upon the detection of each servo gate event. However, from time to time it may be necessary to reset the counter's value to one based on the number of servo wedges per track. Accordingly, if it is determined in step 970 that the current servo gate event is the not the first servo gate to occur since a command was issued, then in step 978 the tracking wedge number is incremented or rolled over if necessary based on the number of servo wedges per track.

Thereafter, it is determined whether the tracking wedge is equal to the servo system tracking wedge in step 980. If this is the case, then step 974 is performed in the manner discussed above. Although step 980 is not required, it offers a further check on the accuracy of the rotational positioning information maintained by the high level processing engine program. If the tracking wedge number does not equal the servo system tracking wedge number then in step 982, the high level processing engine generates an error code which reflects the fact that there has been an error in tracking. In addition, the servo and sector pulse event handlers are set so that no operation is performed. Thereafter, in step 984 a semaphore is generated by the high level processing engine 470 which indicates that an error has occurred in tracking.

Figure 14:
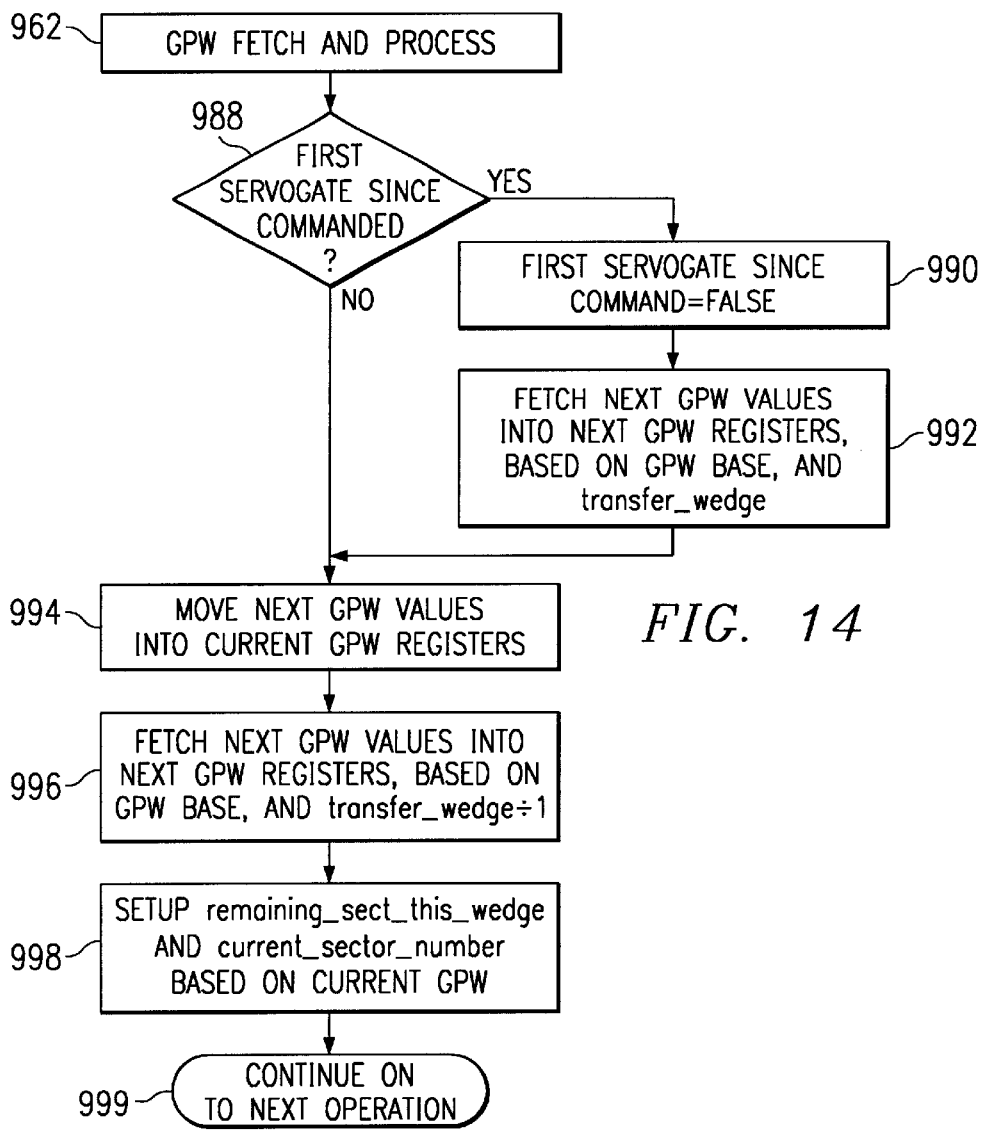
FIG. 14 is a flow chart which shows the process associated with performing geometry per wedge (GPW) based fetching and processing.

FIG. 14 depicts the steps associated with the fetching and processing of GPW based entries 962 from a GPW table. In step 988 it is determined whether the current servo gate event is the first servo gate event to be detected since a command was first issued. If the current servo gate event is the first servo gate event to occur since a command was issued, then in step 990 the value of the above-mentioned servo gate bit is set to FALSE, indicating that the first servo gate has been detected. Thereafter, in step 992 the next GPW entry is fetched into the next GPW register. The fetching is performed based on the GPW base address of a GPW table and the transfer wedge number.

Thereafter, step 994 is performed in which the next GPW entries are loaded into the current GPW register. The next GPW values are then fetched into the next GPW register in step 996 based on the GPW base address and the transfer wedge number is incremented by one. Steps 992, 994 and 996 are performed for the first servo gate event detected after a command was issued, providing at least two sets of GPW entries stored within the registers 496 and 498 so that the GPW entries for the current and next wedges can be readily accessible by the high level processing engine 470. However, if the current servo gate event does not correspond to the first servo gate event to occur after a command was issued, as determined in step 988, then only steps 994 and 996 need be performed to ensure that the GPW entries for the current and next wedges can be readily accessible by the high level processing engine 470.

Following step 996, two values are stored in the file registers 496 and 498 in step 998. These values indicate the remaining number of sectors in a particular wedge and the current sector number based on the current GPW entries. Thereafter, in step 999 the next operation is performed which corresponds to the set-up of the first two sector pulses in the following data wedge as described in step 964 of FIG. 12.

Figure 15:
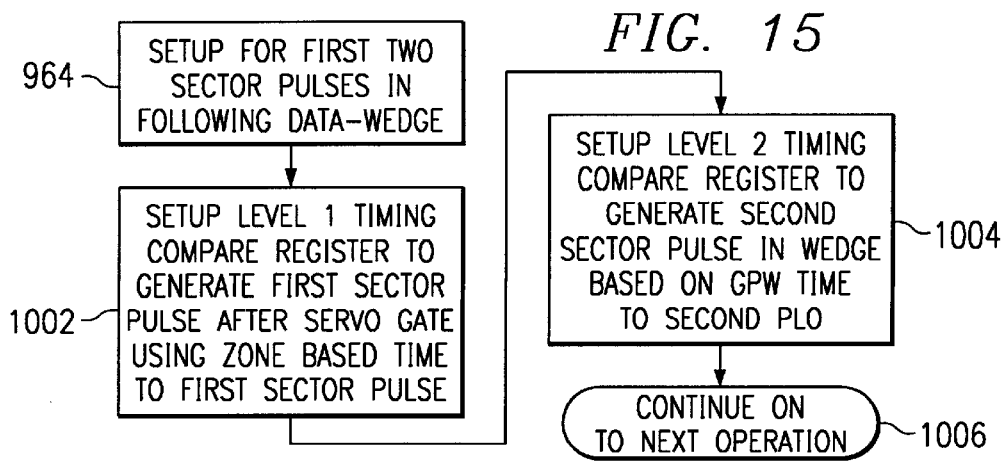
FIG. 15 is a flow chart which shows the process associated with setting up the first two sector pulses in the next date-wedge.

FIG. 15 shows the steps required to set up the first two sector pulses in the following data wedge. In particular, in step 1002 the level one timing compare register 476 is set up to generate the first sector pulse after a servo gate event has occurred using time elapsed from the servo wedge pulse to the first sector pulse following that servo wedge pulse. In step 1004, the level two timing register 177 is set up to generate the second sector pulse in a wedge based on a GPW entry which reflects the timing of the second sector pulse relative to the servo gate pulse event preceding the servo wedge pulse. In step 1006, the next operation is performed in which the servo gate handler 956 branches to the main loop handler 902 via the main loop function pointer, as shown in FIG. 12.

Figure 16:
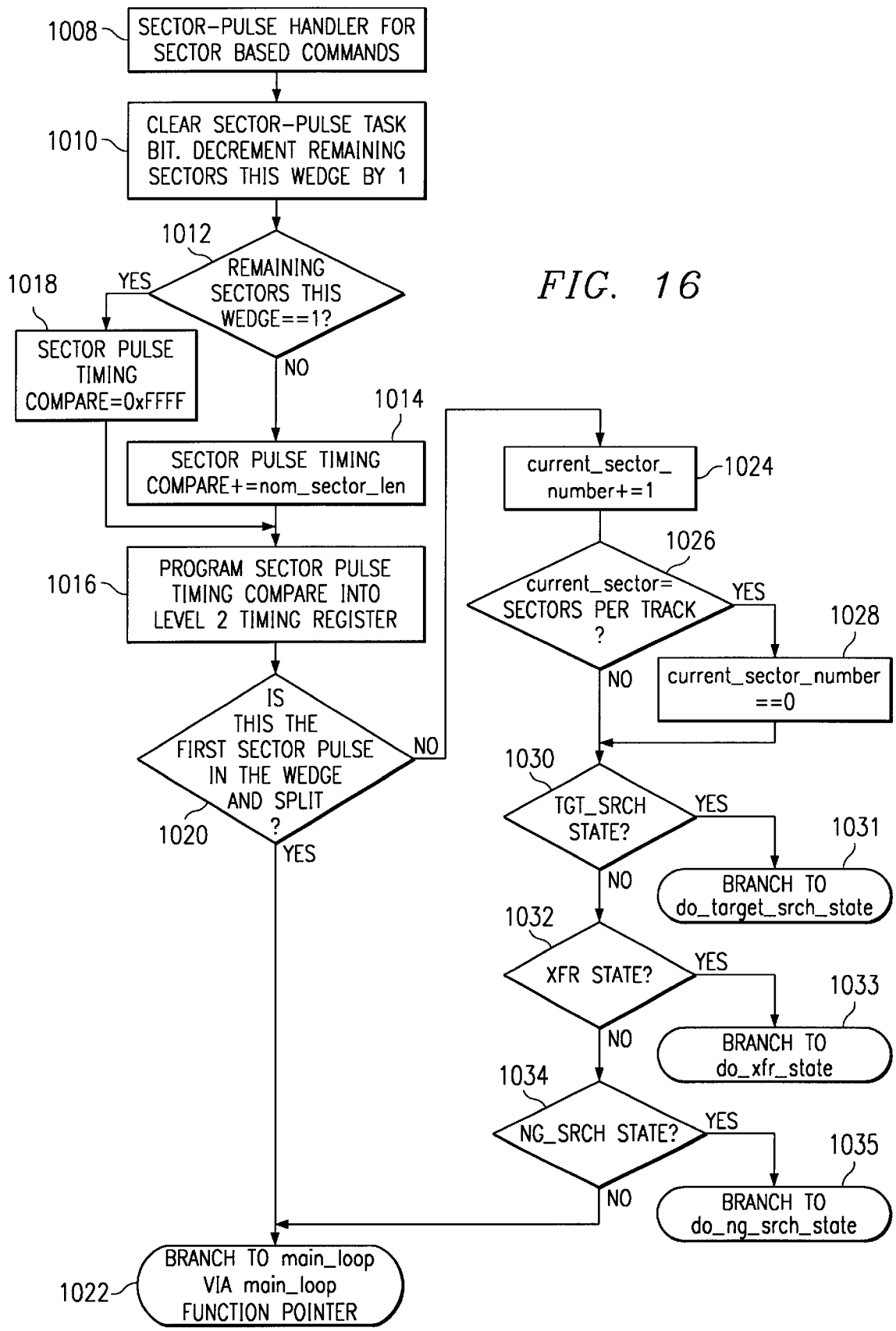
FIG. 16 is a flow chart which shows the process associated with executing a sector pulse handler for sector based commands.

FIG. 16 describes the sector pulse handler 1008 for sector based commands. The sector pulse handler 1008 is stored in the ROM 490. Once a sector pulse is generated it is output to the task register 518, 520, 522, 524 and 526 shown in FIG. 4. FIG. 16 shows the process which occurs with each sector pulse event. In step 1010 the sector pulse task bit in the ST instruction register is cleared. This step is performed so that when the sector pulse handler 1008 returns control to the main loop handler 902, the later does not find a sector pulse event bit in the task register 518, 520, 522, 524 and 526 that is an artifact of a past sector pulse (i.e., the present one). In addition, the remaining sector count in the current wedge is decremented by one.

Thereafter in step 1012 it is determined whether there is only one sector remaining within the current data wedge. If there is only one remaining sector within the current data wedge, there is no need to generate any additional sector pulses within that data wedge. Accordingly, in step 1018 the sector pulse timing compare value is set equal to FFFF to avoid further sector pulse generation if there is only one sector remaining within the current data wedge. The high sector pulse timing compare value will ensure that the servo wedge counter 478 does not reach that value prior to the occurrence of the next servo gate event which resets the counter 478.

If there is more than one sector within the wedge, then in step 1014 the sector pulse timing compare value is incremented by a nominal sector length which reflects the amount of time which elapses between the generation of two contiguous sector pulses. This value will be used to generate the next sector pulse in the current data wedge, assuming that there is one. Thereafter, step 1016 is performed wherein the sector pulse timing compare value generated in steps 1014 and 1018 is loaded into the level two register 477.

The high level processing engine program takes advantage of the two-tier timing compare scheme described above in connection with the level one and two registers 476 and 477 described above. As noted above in connection with FIG. 4, when the comparator 479 detects a match between the value stored in the level ore register 476 and the value output by the servo wedge counter 478, the comparator 479 generates a sector pulse. Thereafter, the value which was stored in the level two register 477 is automatically stored into the level one register 477. The level one register 477 then stores the value corresponding to the very next sector pulse to be generated unless its value is set to FFFF, as noted above.

Next, in step 1020 it is determined whether the current sector pulse is the first sector pulse within the current data wedge and whether the current sector which corresponds to the current sector pulse is split (i.e., a sector fragment). If the current sector is split, then the sector pulse handler transfers control back to the main loop via the main loop function pointer in step 1022. However, if the current sector pulse is not the first sector pulse in the current data wedge and the current sector is not a fragment, then step 1024 is performed in which the current sector number is incremented by one. Thereafter in step 1026 it is determined whether the current sector number is equal to the number of sectors per track. If the current sector number is equal to the number of sectors per track, then in step 1028 the current sector number is reset to 0. Accordingly, assuming that the current track contains 10 sectors numbered from sector 0 to sector 9, if the current sector number has been incremented from 9 to 10, then it must be reset to 0 since the next track will begin with sector number 0.

Step 1030 is performed following step 1028 or in the case in which the current sector number does not equal to the number of sectors per track. In step 1030 it is determined whether the target search state has been asserted. If it is determined in step 1030 that the target search state has been asserted, then in step 1031 the sector pulse handler 1008 will branch to the target search state function.

If it is determined that the target search state has not been asserted, then in step 1032 it is determined whether the transfer state has been asserted. If the transfer state has been asserted, then in step 1033 the sector pulse handler 1008 will branch to the transfer state function. However, if it is determined that the transfer state has not been asserted in step 1032, then in step 1034 it is determined whether the next good search state has been asserted.

If the next good search state has been asserted then in step 1035 the sector pulse handler 1008 will branch to next good search state function. However, if it is determined that the next good search date has not been asserted in step 1034, then step 1022 is performed in which the sector pulse handler 1008 branches to the main loop handler 902 via the main loop pointer.

Figure 17:
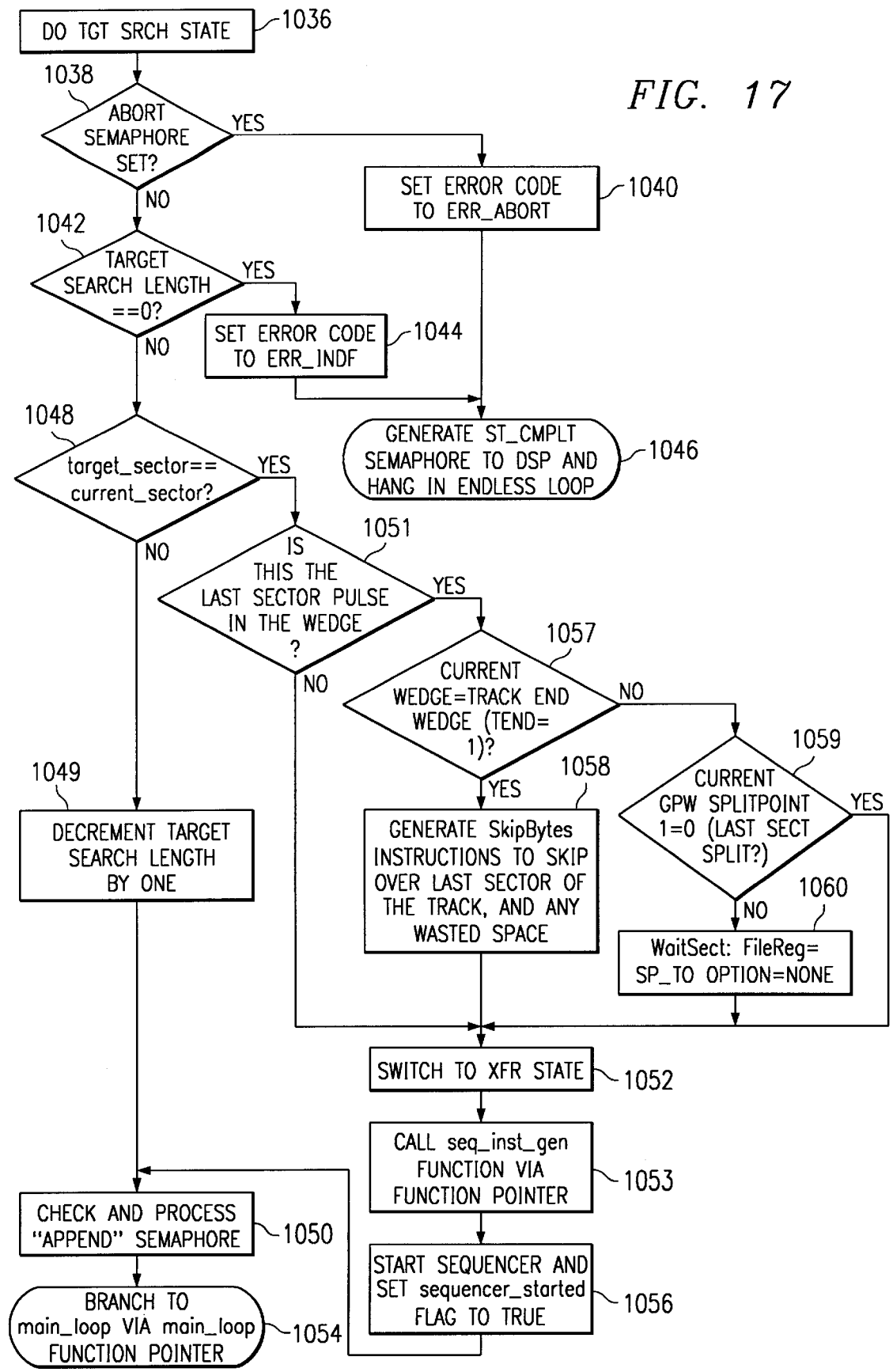
FIG. 17 is a flow chart which shows the process associated with performing a target search for a predetermined sector.

FIG. 17 shows the steps performed by the target search state function 1036 which in the preferred embodiment is stored in the ROM 490. In step 1038, it is determined whether the abort semaphore has been set. In this regard, it is important to note that the DSP 360 has the ability to stop the processing of the current command corresponding to a particular disk operation by generating an abort semaphore. If it is determined in step 1038 that a bit has been set in the task register 520 indicating that an abort semaphore has been generated, then step 1040 is performed in which an error code is generated which indicates that an abort semaphore has been generated.

However, if it has been determined that an abort semaphore has not been generated, then in step 1042 it is determined whether the target search length has been decremented to zero. The target search length is a value output by a target search length counter that starts at a specific number and is decremented each time a sector pulse event is detected which does not correspond to the target sector. The reason for using the target search length counter is to avoid an endless target search because of an error that prevents the target sector from being located.

If the target search length is zero, then in step 1044 an error code is generated which indicates that the target sector cannot be found. Thereafter, in step 1046 a semaphore is generated by the high level processing engine 470 to the digital signal processor 360 which indicates that the high level processing engine 470 has completed its task. In addition, step 1046 is performed following step 1040.

If it is determined in step 1042 that the target search length is not equal to zero then in step 1048 it is determined whether the target sector is equal to the current sector. If it is determined that the current sector is not equal to the target sector, then in step 1049 the target search length is decremented by one and the search must continue for the target sector. Thereafter, in step 1050 the high level processing engine 470 checks to determine whether an append semaphore has been issued by the digital signal processor 360. Once step 1050 is performed then in step 1054 the target search state function 1036 branches to the main loop handler 902 via the main loop function pointer.

Regarding the append semaphore, when a command to perform a particular disk operation is being processed by the high level processing engine program, the DSP 360 is capable of generating a semaphore that causes the high level processing engine 470 to increase the number of sectors to be written. The append semaphore is also employed in connection with the read command or other commands supported by the high level processing engine 470.

By way of example, if the DSP 360 issued a write command to write 10 sectors and later generated an append semaphore to append an additional 3 sectors to the 10 sectors which were the focus of the original write command, then a total of 13 sectors would then be subject to the write command provided that the additional sectors were sequential to the original 10 and were on the same track. Accordingly, the use of the append semaphore will allow for the modification of the transfer length which indicates the original number of sectors to be subject to a particular disk operation.

If it is determined in step 1048 that the target sector does equal the current sector, then in step 1051 it is determined whether the most recent sector pulse, which caused the main loop handler 902 to branch to the sector pulse handler 1008, is the last sector pulse within the wedge. If it is determined in step 1051 that the most recent sector pulse is not the last sector pulse within the wedge then in step 1052 the target search state is switched to the target transfer state. This is significant because once the target sector has been located within the current data wedge, then it can be transferred upon the occurrence of its corresponding sector pulse. By way of example, there may be a 100 sectors to be transferred, if it starts at sector N then the high level engine 470 can wait until sector N is located before the transfer state can be entered and the sectors transferred.

Following step 1052, the sequence instruction generator is called by the target search state function 1036 via the function pointer that generates the sequencer instructions in step 1053. Thereafter, in step 1056 the sequencer is started and a software flag is set to true to reflect the engagement of the low level processing engine 480. Steps 1050 and 1054 are then performed in the manner described above.

If it is determined in step 1051 that the most recent sector pulse is the last sector pulse in the wedge, then in step 1057 it is determined whether the current wedge is the last wedge in the track. If it is determined that the current wedge is the last wedge in the track, then in step 1058 skip bites instructions are generated to skip over the last sector of the track, and any additional space within that sector.

The reason for skipping the last sector and any remaining space within the sector stems from the fact that if the current wedge is the last wedge on the track, then the comparison of the target sector number and the current sector number in step 1048 is made with respect to the first sector in the next wedge. As a result, it is necessary to generate a skip bytes instruction to skip over the last sector of the track and any wasted space. On the last wedge of a track there may be some wasted space at the end that cannot be allocated because there is insufficient space for an entire sector and because the last sector in the last wedge cannot be split. Following step 1058, steps 1052, 1053, 1056, 1050 and 1054 are performed sequentially in the manner discussed above.

If it is determined in step 1057 that the current data wedge is not equal to the track end wedge, then in step 1059 it is determined whether the most recent sector pulse corresponds to a split sector. If the last sector pulse corresponds to a split sector, then in step 1060 an instruction is generated which indicates that the low level processing engine 480 must wait until an additional sector pulse is generated before executing any additional instructions.

Because the high level processing engine program is always looking ahead to the next sector, the split sector at the beginning of the next data wedge will have been accounted for when the split sector at the end of the preceding wedge is evaluated. Accordingly, there is no need for the high level processing engine 470 to generate additional instructions for the split sector at the beginning of the next data wedge. In other words, the instructions that the high level engine is generating are not for the first sector fragment in the next wedge. Rather, they are for the next full sector after the first split sector in the next wedge. The wait sector instruction permits the high level processing engine to skip over the split sector in the beginning of the next wedge by causing the high level processing engine 470 to delay execution of the next instruction until the following sector pulse which corresponds to the first full sector in the next data wedge.

In the case in which it is determined that the last sector pulse does not correspond to a sector fragment, or following step 1060, steps 1052, 1053, 1056, 1050 and 1054 are performed sequentially in the manner discussed above.

Figure 18:
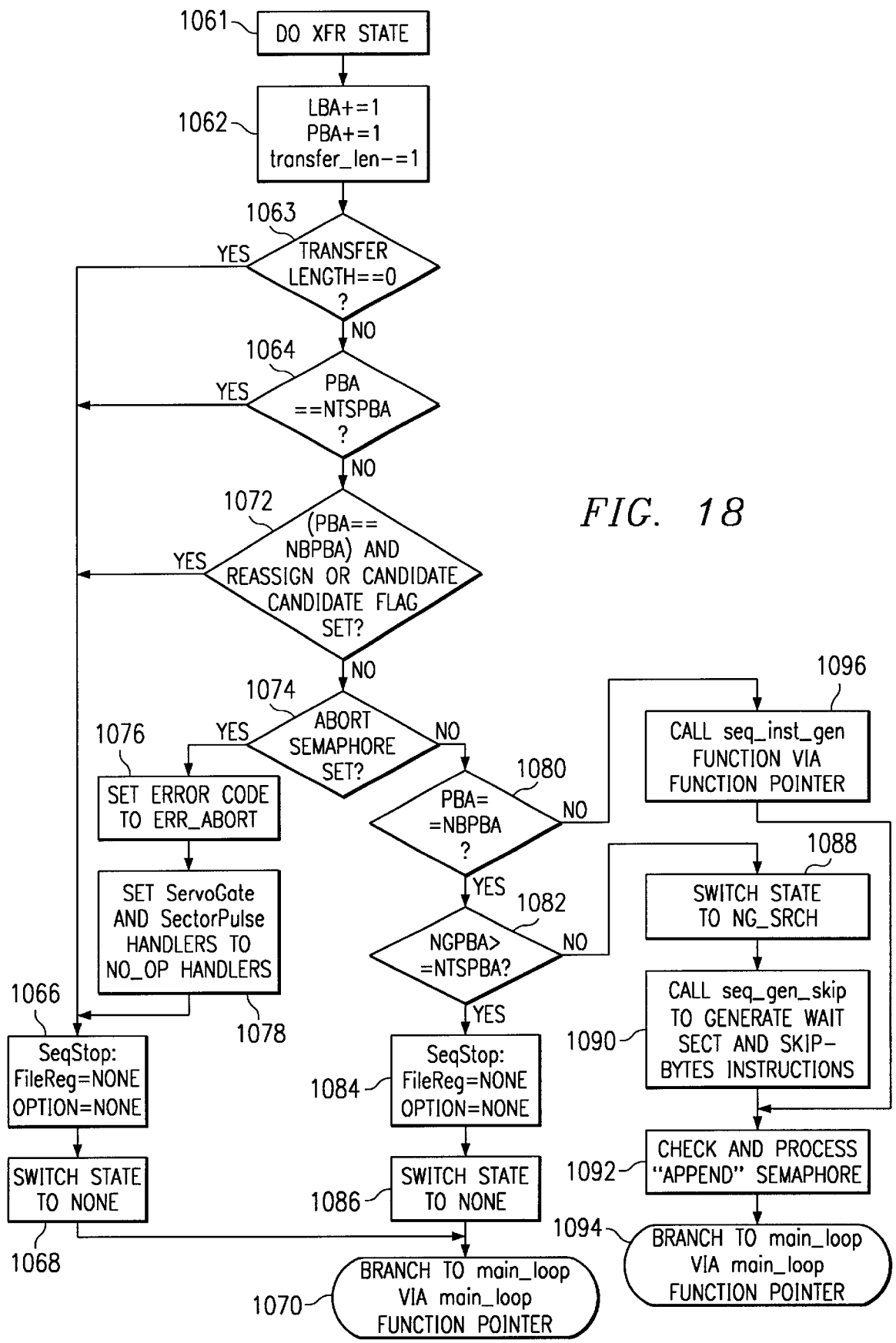
FIG. 18 is a flow chart which shows the process associated with performing a sector transfer for a predetermined sector.

FIG. 18 depicts the steps of the transfer state function 1061 which may be stored in the ROM 490. By way of overview, once a target sector is located during the execution of the target search state function 1036, then the high level processing engine program switches from the target search state to the transfer state until the requested number of sectors have been transferred or until the next bad sector is encountered. If the latter occurs, then the high level processing engine program will switch from the transfer state to the next good search state. Thereafter, the next good search state function will be performed in the manner described below. In this regard, when the transfer state function determines that the present physical block address is equal to the next bad sector, then the high level processing engine program will not perform a transfer with respect to that particular sector.

The first step performed by the transfer state function is step 1062, in which the logical block address and physical block address are both incremented by one while the transfer length is decremented by one. The logical block address and physical block address are incremented by one because the high level processing engine program is in a transfer state so the transfer state function increments the blocks because the previous sector has already been addressed.

Thereafter in step 1063, it is determined whether the transfer length is equal to zero. If the transfer length is not equal to zero, then in step 1064 it is determined whether the physical block address is equal to the next track start physical block address. If it is determined that the transfer length is equal to zero or the physical block address is equal to the next track start physical block address, then step 1066 is performed in which a sequencer stop instruction is generated. The sequencer stop instruction ensures that after the current transfer in progress has been completed the low level processing engine 480 will stop executing instructions.

With regard to the transfer length, if it is zero, then all of the relevant sectors have been transferred. Therefore, there is no need for the low-level processing engine 480 to continue executing instructions with respect to the command which triggered the transfer. Where the physical block address is equal to the next track star physical block address, it is not necessary to process the corresponding sector because it is not on the present track. Rather, the sector having that physical block address can be found on the next track.

Following step 1066, the transfer state is switched to the non-transfer state, which means that each of the three states (search, transfer, or next good search) is no longer active in step 1068. Thereafter, in step 1070 the transfer state handler branches to the main loop handler 902 via the main loop function pointer.

If it is determined in step 1064 that the physical block address is not equal to the next track start physical block address, then in step 1072 it is determined whether the physical block address is equal to the next bad physical block address and the reassign or candidate flag is set. If the physical block address is equal to the next bad physical block address and the reassign or candidate flag is set, then the next good block is not on this track. Therefore, rather than searching for the next good physical block address, the high level processing engine program stops the low level processing engine 480 from executing instructions in order to find out where the next good physical block addressed as been reassigned by searching a defect table containing reassignment information. Accordingly, if the physical block address is equal to the next bad physical block address and the reassign or candidate flag is set, then steps 1066, 1068 and 1070 are sequentially performed in the manner described above.

However, if it is determined in step 1064 that the physical block is not equal to the next bad physical block physical block address, or the reassign or candidate flag is not set, then in step 1074 it is determined whether the abort semaphore has been set by the digital signal processor 360. As previously discussed, the abort semaphore permits the DSP 360 to manually abort the high level processing program.

Figure 19:
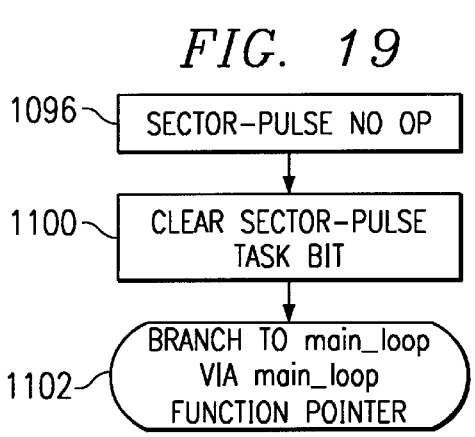
FIG. 19 is a flow chart for a sector pulse operation in which a sector pulse task bit is cleared.
Figure 20:
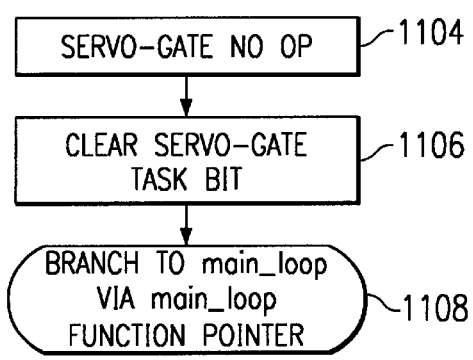
FIG. 20 is a flow chart for a servo gate operation in which a servo gate task bit is cleared.

If the abort semaphore has been set, then in step 1076 an error code is generated which indicates that the abort semaphore has been generated. Thereafter, in step 1078 the servo gate and sector pulse handlers are both set to the no operation handlers in a manner which is similar to step 1068, in which the state is switched to none. In these circumstances, these no operation handlers clear the servo gate task bit and the sector pulse task bit and return to the main loop handler 902 via the main loop pointer in the manner shown in FIGS. 19 and 20. Thereafter, steps 1066, 1068 and 1070 are sequentially performed in the manner described above.

If it is determined that the abort semaphore has not been set in step 1074, then in step 1080 is performed in which it is determined whether the physical block address is equal to the next bad physical block address. If the physical block address is equal to the next bad physical block address then in step 1082 it is determined whether the next good physical block address is greater than or equal to the next track start physical block address. Essentially, step 1082 prevents a series of checks for the next good physical block address within the current track if it cannot be found therein.

If it is determined in step 1082 that the next good physical block address is greater than or equal to the next track start physical block address, then rather than searching for the next good block, the high level processing engine program will generate a stop sequencer instruction in step 1084 and switch to the non transfer state pursuant to step 1086. Thereafter, step 1070 is performed in the manner described above.

If it is determined in step 1082 that the next good physical block address is less than the next track start physical block address, then in step 1088 the transfer state is switched to the next good search state. In this case, the next good sector is on the current track. Accordingly, a search can be performed for the next good physical block address.

Following step 1088, step 1090 is performed in which the sequencer generator skip function is called to generate a wait sector pulse and skip bytes instructions. Thereafter, in step 1092 it determined whether the append semaphore has been set in the manner described above. Following step 1092, the transfer state handler branches to the main loop handler 902 via the main loop function pointer in step 1094.

Figure 21:
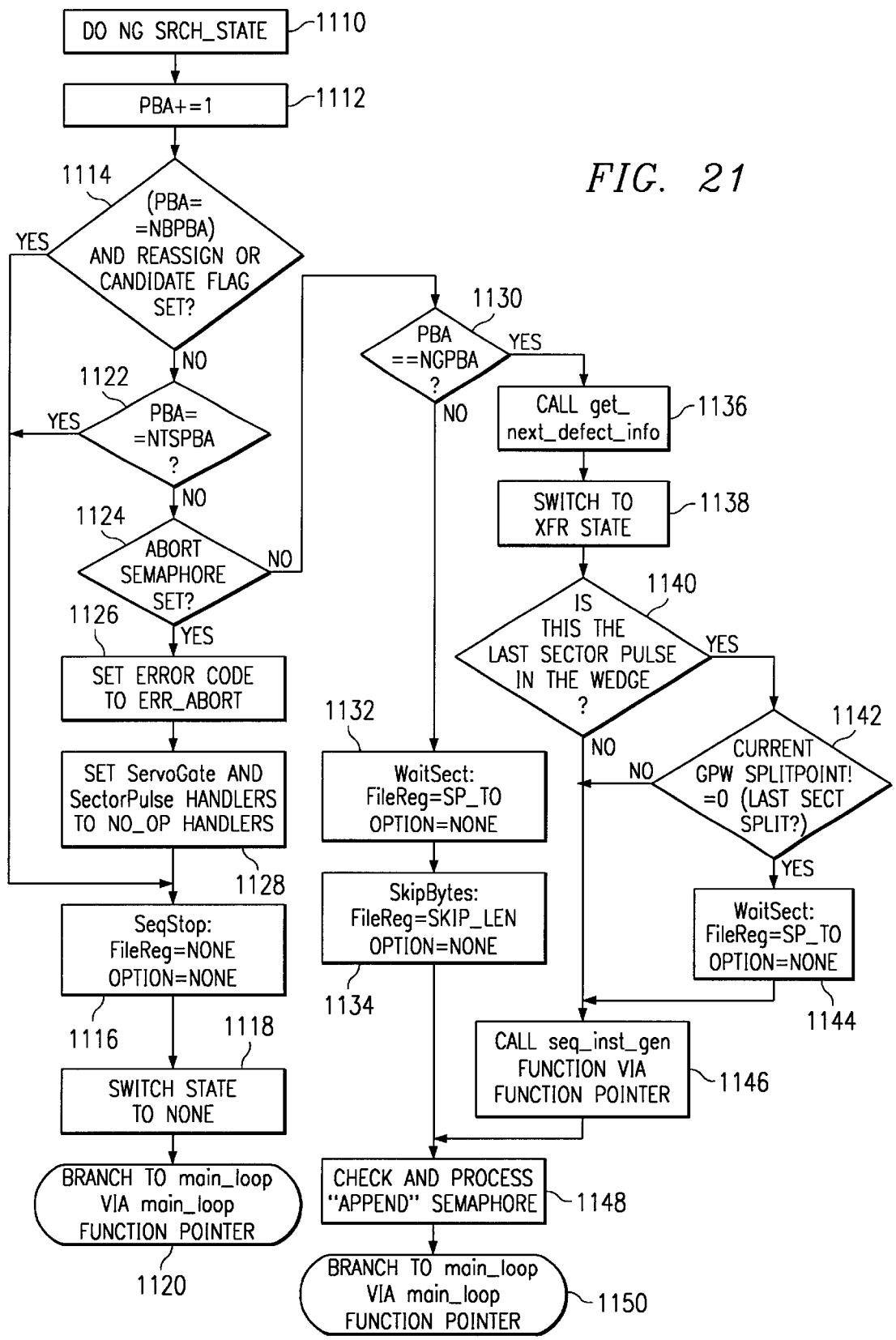
FIG. 21 is a flow chart which shows the process associated with searching for the next good sector.

If it is determined in step 1080 that the physical block address is not equal to the next bad physical block address, then in step 1096 the sequencer instruction generator function is called via the function pointer. Because the physical block address is not the next bad physical block address, it must be a good physical block address, and as the high level processing program has already decided that it is or this track, it is going to be transferred. Thereafter, steps 1092 and 1094 are performed in the manner described above. FIG. 21 describes the steps associated with the next good search state function 1110 which may be stored in the ROM 490. By way of overview, the switch to the next good search state from the transfer state indicates that the disk formatter has encountered a bad sector that needs to be skipped. In the next good search state, the high level processing engine program must seek out the next good physical block address after having found a bad physical block address.

While searching for the next good physical block address, the high level processing engine program can end up skipping multiple sectors due to, for example, a bad servo burst. The high level processing engine program will switch back and forth between the transfer state and the next good search state as the program attempts to locate all the sectors to be transferred with respect to a particular command.

The first step performed by the next good search state function is step 1112, in which the physical block address is incremented by one. Notably, the logical block address is not incremented by the next good search state function. The reason stems from the fact that the high level processing engine program is skipping bad sectors which are not assigned a unique logical block address. Thus, while logical block addresses are all logically contiguous, they may be separated by a number of physical block addresses. In contrast, every sector on a track has a unique physical block address, whether it is a bad or good sector.

Following step 1112, step 1114 is performed in which it is determined whether the physical block address is equal to the next bad physical block address and the reassign or candidate flags are set. If the physical block address is equal to the next physical block address and the reassign or candidate flags are set, then in step 1116 the sequencer stop instruction is generated. Thereafter, in step 1118 the next good search state is switched to a non search state.

Following step 1118, step 1120 is performed in which the next good search state handler 1110 branches to the main loop handler via the main loop function pointer. In essence, the disk formatter has encountered a reassign. Accordingly, the next good sector will not be found on the present track. Therefore, the low level processing engine 480 will simply be stopped.

If it is determined in step 1114 that the physical block address is not equal to the next physical block address or even if it is, both the reassign or candidate flags are not set, then in step 1122 it is determined whether the physical block address is equal to the next track start physical block address. If the physical block address is not equal to the next tract start physical block address, then in step 1124 it is determined whether an abort semaphore has been generated. If it is determined that the abort semaphore has been generated, then step 1126 is performed in which an error code is generated to reflect the fact that the abort semaphore is generated. Thereafter, in step 1128 the servo gate and sector pulse handlers are set to the no operation handlers. Following step 1128, steps 1116, 1118 and 1120 are performed sequentially in the manner described above.

In addition, steps 1116, 1118 and 1120 will also be performed sequentially if it is determined in step 1122 that the physical block address is equal to the next track start physical block address.

If it is determined in step 1124 that the abort semaphore has not been set then in step 1130 it is determined whether the physical block address is equal to the next good physical block address. If it determined in step 1130 that the physical block address is not equal to the next good physical block address, then in step 1132 a wait sector pulse instruction is generated so as skip the sector corresponding to that physical block address. Thereafter, in step 1134 a skip bytes instruction is generated. Following step 1134, steps 1148 and 1150 are performed in the manner described below.

If it is determined in step 1130 that the physical block address is equal to the next good physical block address, then in step 1136 a get next defect info function is called. As a result, the next defect table entry must be fetched so that a new next good value and a new next bad value can be calculated. Thereafter, the next good search state is switched to the transfer state in step 1138. The reason is that, if the physical block address is equal to the next good physical block address, the high level processing engine program must be back in the transfer state to reflect the fact that sectors are no longer being skipped.

Following step 1138, step 1140 is performed in which it is determined whether the most recent sector pulse is the last sector pulse within the wedge. If the most recent sector is the last sector pulse in the wedge, then in step 1142 it is determined whether the last sector is a split sector. If it is determined that the last sector is a split sector, then a wait sector instruction is generated in step 1144. In essence, if the most recent sector pulse corresponds to the last sector in a wedge, then the next wedge starts with a split sector, as noted above. Therefore, a wait sector pulse instruction is generated in order to skip the first sector pulse in the following data wedge.

Following step 1144, the sequence instruction generation function handler is called via the function pointer in step 1146. Thereafter, step 1148 is performed in which an append semaphore is checked for and processed if it has been generated. Following step 1148, step 1150 is performed in which the next good search state function branches to the main loop handler 902 via the main loop function pointer.

Step 1146 is also performed if it is determined in step 1140 that the most recent sector pulse is not the last sector pulse in the current wedge, or if it is determined in step 1142 that the last sector is not a split sector.

Although a GPW entry may be implemented in a number of ways, Table 1.1 below provides one possible implementation of a GPW entry including a number of fields.

| 1.1. GPW (Geometry Per Wedge) Fields | | | | | | | | | | | | | | | |
| --- | --- | --- | --- | --- | --- | --- | --- | --- | --- | --- | --- | --- | --- | --- | --- |
| 15 | 14 | 13 | 12 | 11 | 10 | 9 | 8 | 7 | 6 | 5 | 4 | 3 | 2 | 1 | 0 |
| P | 1st Frag. | Reserved | | Time to Generate the Second Sector Pulse after a Servo Wedge (servo clocks) | | | | | | | | | | | |
| P | Number of Sector Pulses | | | | | | | Ending Fragment Length (bytes) | | | | | | | |
| P | Reserved | | | TEND | | | | First Sector Number in Current Data Wedge | | | | | | | |

1st Frag.: This bit is set when the data wedge contains a split fragment from previous data wedge.
TEND: This bit indicates that this GPW entry is the last in a track. Next GPW entry shall start from beginning of a track.

-continued

| 1.1. GPW (Geometry Per Wedge) Fields | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |

Time to Generate the Second Sector Pulse after a Servo Wedge: The time from servo sync to the second PLO after a servo wedge is fixed per zone basis. Sector split may happen at the servo wedge and therefore the time delay from servo sync to the PLO of the first sector of current wedge needs to be specified in the table.
Ending Fragment Length: The very last sector in current data wedge may have portion of its whole length resides in current data wedge.
First Sector Number in Current Data Wedge: This is used to find out the sector number when the head seeks to a new location.
Number of Sector Pulses: Contains the total number of sector pulses including the one for the first fragment if there is.

It will be apparent to those skilled in the art that various modifications and variations can be made to the apparatus and method of the present invention without departing from the spirit or scope of the invention. Thus, it is intended that the present invention covers the modifications and variations of this invention provided they come within the scope of the appended claims and their equivalents.

What is claimed is:

1. A method of implementing a geometry per wedge (GPW) based headerless solution in a disk drive formatter having a corresponding memory buffer, said disk drive formatter comprising a high processing engine and a low processing engine and formatting a data storage disk, said method comprising the steps of:

providing a memory buffer, a high level processing engine under control of a first clock and a low level processing engine under control of a second clock independent of said first clock;

generating a disk sequencing instruction with said high level processing engine to control said disk operation;

processing a command instruction which instructs said high level processing engine to execute a disk operation with said low level processing engine by executing said disk sequencing instruction, said disk operation including the steps of:

searching for said predetermined sector using sector layout information derived from a GPW table including entries which define the relative position of sector pulses on a track within a data wedge of said disk; and transferring said predetermined sector from said disk to said buffer memory.

2. The method defined in claim 1, wherein said step of searching comprises the steps of:

determining whether the next sector to be searched for corresponds to said target sector;

determining whether the next sector is a bad sector if said next sector corresponds to said target sector;

searching for the next good sector if said next sector corresponds to a bad sector; and assigning said next good sector as said target sector.

3. A method of providing for efficient communication between high and low level processing engines of a disk formatter for formatting a disk which stores data, comprising the steps of:

providing a high level processing engine and a low level processing engine, said low level processing engine having an instruction queue;

providing a disk formatted in accordance with a wedge based formatting scheme, said disk having a plurality of data wedges, each data wedge having at least one sector, said data wedges separated from each other by a plurality of servo wedges, one servo wedge disposed between each pair of adjacent data wedges and a plurality of tracks extending around said disk through said data wedges and said servo wedges;

selecting under control of said high level processing engine a predetermined one of said sectors and generating sector timing compare values responsive to the locations of the predetermined selected sector and the sectors within the wedge which precede the predetermined sector, said sector timing compare values being determined by the amount of time required for travel from the beginning of a servo wedge to the beginning of a following sector in a following data wedge;

generating sector pulses indicative of the start of said predetermined sector in response to said sector timing compare values;

responsive to said sector pulses, generating a burst of low-level instructions from said high level processing engine to said low level processing engine and storing said instructions in said instruction queue in accordance with a clock signal from the high level processing engine.

4. The method of claim 3 wherein said instruction queue is a first in first out (FIFO) memory device.

5. The method of claim 4 wherein said memory device is a random access memory device.

6. The method of claim 3 further including the step of repeating said sector timing compare values for each succeeding sector pulse.

7. The method of claim 3 further including the step of outputting said instructions individually from said instruction queue in accordance with a clock signal from said low level processing engine, decoding said instructions, and generating control signals from the decoded instructions.

8. The method of claim 4 further including the step of outputting said instructions individually from said instruction queue in accordance with a clock signal from said low level processing engine, decoding said instructions, and generating control signals from the decoded instructions.

9. The method of claim 5 further including the step of outputting said instructions individually from said instruction queue in accordance with a clock signal from said low level processing engine, decoding said instructions, and generating control signals from the decoded instructions.

10. The method of claim 6 further including the step of outputting said instructions individually from said instruction queue in accordance with a clock signal from said low level processing engine, decoding said instructions, and generating control signals from the decoded instructions.

11. The method of claim 3 wherein said high level processing engine and said low level processing engine are under control of separate clock signals operable at different clock rates.

12. The method of claim 4 wherein said high level processing engine and said low level processing engine are under control of separate clock signals operable at different clock rates.

13. The method of claim 5 wherein said high level processing engine and said low level processing engine are under control of separate clock signals operable at different clock rates.

14. The method of claim 6 wherein said high level processing engine and said low level processing engine are under control of separate clock signals operable at different clock rates.

15. The method of claim 7 wherein said high level processing engine and said low level processing engine are under control of separate clock signals operable at different clock rates.

16. The method of claim 8 wherein said high level processing engine and said low level processing engine are under control of separate clock signals operable at different clock rates.

17. The method of claim 9 wherein said high level processing engine and said low level processing engine are under control of separate clock signals operable at different clock rates.

18. The method of claim 10 wherein said high level processing engine and said low level processing engine are under control of separate clock signals operable at different clock rates.

* * * * *